US012254343B2

(12) United States Patent
Askeland et al.

(10) Patent No.: US 12,254,343 B2
(45) Date of Patent: Mar. 18, 2025

(54) EXECUTABLE COMPONENT INTERFACE AND CONTROLLER

(71) Applicant: Zoox, Inc., Foster City, CA (US)

(72) Inventors: Jacob Lee Askeland, San Jose, CA (US); Ryan Martin Cahoon, Mountain View, CA (US); Christopher Yeates Brown, Los Altos, CA (US)

(73) Assignee: Zoox, Inc., Foster City, CA (US)

( * ) Notice: Subject to any disclaimer, the term of this patent is extended or adjusted under 35 U.S.C. 154(b) by 21 days.

(21) Appl. No.: 16/198,653

(22) Filed: Nov. 21, 2018

(65) Prior Publication Data

US 2020/0159570 A1    May 21, 2020

(51) Int. Cl.
G06F 9/48    (2006.01)

(52) U.S. Cl.
CPC ...... G06F 9/4843 (2013.01); *G06F 2209/483* (2013.01)

(58) Field of Classification Search
None
See application file for complete search history.

(56) References Cited

U.S. PATENT DOCUMENTS

| | | | |
|---|---|---|---|
| 5,694,539 A | 12/1997 | Haley et al. | |
| 9,728,228 B2 * | 8/2017 | Palmer | G11B 27/105 |
| 11,069,257 B2 * | 7/2021 | Palmer | G09B 19/167 |
| 11,263,579 B1 * | 3/2022 | Siegel | G06Q 10/0832 |
| 2003/0093485 A1 * | 5/2003 | Dougall | H04L 47/26 |
| | | | 709/208 |
| 2006/0075265 A1 | 4/2006 | Hamaoka et al. | |
| 2007/0198676 A1 | 8/2007 | Vertes | |

(Continued)

FOREIGN PATENT DOCUMENTS

| | | |
|---|---|---|
| JP | 2010128906 A | 6/2010 |
| JP | 2011504630 A | 2/2011 |

(Continued)

OTHER PUBLICATIONS

Hu et al., Holistic Scheduling of Real-Time Applications in Time-Triggered In-Vehicle Networks, Aug. 2014, IEEE Transactions on Industrial Informatics, vol. 10, No. 3, pp. 1817-1828 (Year: 2014).*

(Continued)

*Primary Examiner* — Bradley A Teets
*Assistant Examiner* — Melissa A Headly
(74) *Attorney, Agent, or Firm* — Lee & Hayes, P.C.

(57) ABSTRACT

A controller may control input to, output from, and execution of a component of a data-processing pipeline via an interface. The interface facilitates replacing the component with a different and/or updated component and/or changing a type of controller that controls the component via the interface. For example, the different types of controllers may facilitate communication between components controlled by other controllers (and/or that aren't controlled by a controller), controllers that generate reproducibility data so that component behavior may be reproduced, controllers that reproduce component behavior, and/or controllers that tune performance of the data-processing pipeline, e.g., by varying input, output, and execution of respective component(s).

21 Claims, 9 Drawing Sheets

(56) References Cited

U.S. PATENT DOCUMENTS

| | | | |
|---|---|---|---|
| 2014/0204103 A1* | 7/2014 | Beer-gingold | G06T 1/20 |
| | | | 345/522 |
| 2016/0085584 A1* | 3/2016 | Pedersen | G06F 9/5027 |
| | | | 718/102 |
| 2017/0126801 A1* | 5/2017 | Tan | H04N 21/43615 |
| 2019/0220011 A1* | 7/2019 | Della Penna | G07C 5/085 |
| 2019/0268601 A1* | 8/2019 | Lu | H04N 19/105 |
| 2019/0303759 A1 | 10/2019 | Farabet et al. | |
| 2019/0317510 A1 | 10/2019 | Ros Sanchez | |
| 2020/0159685 A1 | 5/2020 | Askeland et al. | |

FOREIGN PATENT DOCUMENTS

| | | |
|---|---|---|
| JP | 2013012088 A | 1/2013 |
| JP | 2014191828 A | 10/2014 |
| JP | 2017179120 A1 | 5/2018 |
| WO | WO2016183563 A1 | 11/2016 |
| WO | WO2017179120 A1 | 5/2018 |

OTHER PUBLICATIONS

Jayadev Misra; Distributed Discrete-Event Simulation, Compuiting Surveys, vol. 18, No. 1, Mar. 1986 (27 pages).

PCT Invitation to Pay Additional Fees mailed on Feb. 27, 2020 for PCT Application No. PCT/US19/62502, 14 pages.

PCT Search Report and Written Opinion mailed on Jun. 23, 2020 for PCT Application No. PCT/US2019/062502, 21 pages.

Japanese Office Action mailed Dec. 5, 2023 for Japanese Application No. 2021-529052, a foreign counterpart to U.S. Pat. No. 10,678,740, 4 pages.

European Office Action mailed Feb. 27, 2024 for European Application No. 19818449.1, a foreign counterpart to U.S. Pat. No. 10,678,740, 8 pages.

* cited by examiner

EXECUTABLE COMPONENT INTERFACE AND CONTROLLER

BACKGROUND

Various systems may rely on complex data processing pipelines to control the system. For example, a data processing pipeline may be used to control a manufacturing process, track multiple conversations in a room and convert audio to text while identifying distinct speakers, control motion of an autonomous robot through an environment, coordinate movements of microscopic nanotubes via chemical stimulus and/or biofeedback, etc. However, these data processing pipelines are so complex that, at times, tuning performance of the data processing pipeline may be difficult because changes that improve one element of the processing pipeline may actually cause the output of the entire pipeline to be worsened. Moreover, if an element of a data processing pipeline is performing sub-optimally, the complexity of the processing pipeline may obscure the element or elements to which this is attributable.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
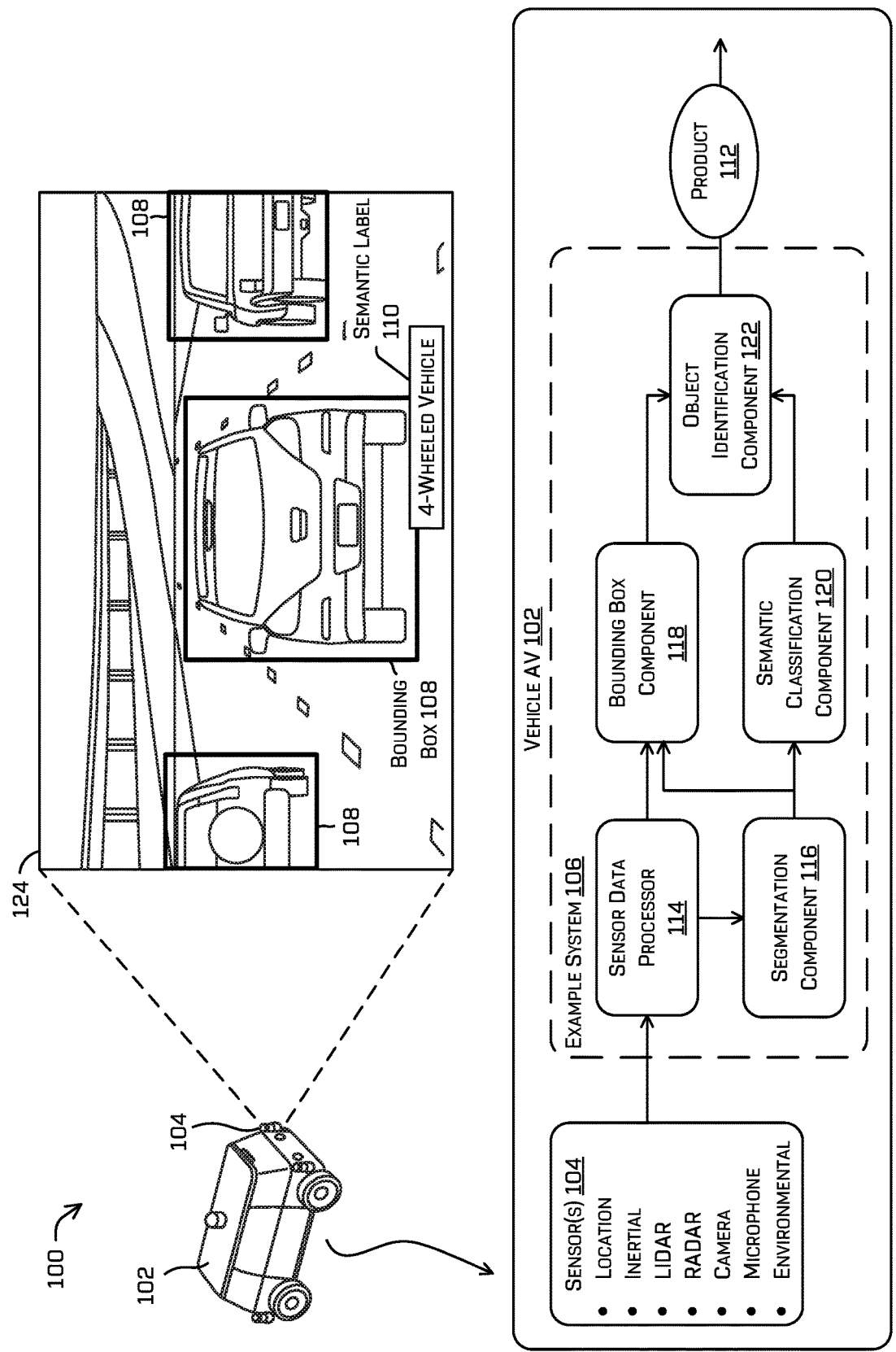
FIG. 1 illustrates an example scenario depicting an autonomous vehicle that includes a system configured according to a native configuration.

As discussed above, systems may comprise complex data processing pipelines that may obscure an issue with a component of the processing pipeline and prevent or hamper efforts to tune performance of the data processing pipeline. Moreover, components of a pipeline may be different types of components—a first component may be implemented in software executed by a processor and a second component may be implemented as hardware such as a field-programmable gate array (FPGA) or an application-specific integrated circuit (ASIC), or in an additional or alternate example, a first component may be implemented in a kernel layer of an operating system, a second component may be implemented in an application layer of the operating system, and a third component may be implemented in an application layer of a different operating system. The components may vary in their function and therefore function in the inputs thereto and outputs therefrom.

Furthermore, attempts to replay (i.e., attempt to reproduce activity) operation of the data pipeline offline may result in non-deterministic output, meaning, given a particular input, the data pipeline may not always produce a same output. This is particularly aggravated when components of the data pipeline operate in parallel on different computing nodes (e.g., different graphics processing unit (GPU) pipelines and/or different GPUs, different central processing unit (CPU) core(s) and/or different CPUs, different machines connected over a network, different virtual machines), which may be necessary in some applications to achieve an operating speed useful for controlling an autonomous vehicle in real-time.

Regardless of the use case, this application discusses techniques pertinent to component(s) of a system (e.g., a data processing pipeline, a computer vision system, a perception component). As used herein, a system may comprise one or more components. A component may, itself, comprise a system of multiple elements (e.g., various combinations of hardware and/or software).

To illustrate, a system of an autonomous vehicle may comprise an artificial intelligence (AI) stack that comprises multiple systems such as, for example, a perception system, a localization system, a planner system, a drive module control system, an internal operations system, etc. Each of these systems, in turn, may comprise tens, hundreds, or even thousands of components. A perception system, for example, may include one or more sensor data processing components, a component for segmenting an image, a component for segmenting points of LIDAR data, a component for classifying an object identified in sensor data, a component for tracking an object, etc. Moreover, one of these components may include a plurality of sub-components such as neural network(s) and/or other machine-learned models, instructions executable by a processor, and/or hardware.

This application describes techniques comprising a framework that controls inputs to and/or outputs from a component and/or controls when and/or how long a component operates.

The framework discussed herein may configure a system so that actions taken by component(s) of the system may be reproduced deterministically, meaning, for every same input that is provided to the system implementing the framework, a same output is generated by the system. In some instances, the framework also facilitates the ability to replace a component of a system with another component in a "plug-and-play" manner when, formerly, a developer would have needed to specify a pipeline flow and/or re-write portions of other components. In some examples, the techniques discussed herein include replacing a component of a system with an alternate component and comparing behavior of the system before and after the replacement. For example, the framework may reproduce behavior of the AI stack discussed above using log data (and/or may deterministically simulate behavior of the AI stack using simulation data) to achieve a first set of outputs from the AI stack and/or components thereof. A perception system of the AI stack may be replaced by an updated and/or different perception system and the framework may run the AI stack using the same log data and/or simulation data, allowing behavior/performance of the AI stack to be compared before and after the replacement. In at least some examples, the framework may enable preserving certain system variables (e.g., internal states, execution times, etc.), despite having differing components. In such examples, the system may be able to categorize how a component impacts overall system accuracy and/or precision, regardless of system resources required.

In some instances, the framework may comprise a controller that provides signals to an I/O interface between the component and the controller. In some examples, a controller may be the destination and source of all I/O functions of a component and/or the controller may cause the component to execute. In other examples, at least one input and/or output of a component may be input or output outside of the controller. Additionally or alternatively to controlling input and/or output to the component, the controller may control an execution state of the component (e.g., cause execution of the component, prevent execution, controlling when and/or how long the component executes, cause an internal state of the component to be set to a specified internal state). To control input provided to, output from, and/or execution of a component, a controller may provide signals and/or other data to the I/O interface and/or may control a status of the I/O interface (e.g., the controller may set a value/flag stored in a register associated with the component; the controller may call a process associated with the component). In examples where the component comprises processor-executable instructions, the controller may cause the component to operate by causing the processor-executable instructions to be executed by one or more processors (e.g., pushing an address associated with a process of the component onto a stack; setting a flag in the I/O interface where the component is configured to push the address onto the stack responsive to determining that the flag state indicates that the component should execute).

In some instances, the I/O interface may comprise a first input interface configured to receive one or more variables from a controller (an "initialization" input interface), a second input interface configured to receive an indication to execute from a controller (an "execution" input interface) (e.g., the indication may further comprise a duration to execute and/or the indication may comprise a flag that, while high, causes the component to execute), a third input interface that is configured to receive a keyframe from the controller and set an internal state of the component based at least in part on the keyframe (e.g. this may comprise deserializing the keyframe to determine the internal state), a first output interface that outputs a keyframe based at least in part on an internal state of the component (e.g., this may comprise serializing an internal state of the component to determine the keyframe, the component may periodically output a keyframe (e.g., every 500 executions, every 1,000 executions) and/or when the internal state changes by a degree of change that meets or exceeds a threshold degree of change), and/or a second output interface that outputs a product of an execution of the component.

Note that, as used herein, a "product" and an "output" (in its uses as a noun) may be used interchangeably to refer to an output of an execution of a component and/or an output of a system. For example, a component may output an output/product responsive to executing. This output/product may be output by a system as an output/product and/or this output/product may be received by another component of the system that may also generate a second output/product. The system may additionally or alternatively output the second output/product. Use of the word "product" thereby avoids a confusing situation where a component may output (verb) via an output interface an output (noun).

The techniques discussed herein may comprise a variety of types of controllers. For example, and without limitation, the types of controllers may comprise an online controller, a reproducing controller, and/or a coordinating controller. The different types of controllers may all be configured to control input to, output from, and/or execution states of a component and may be configured to do so agnostically (e.g., without needing any knowledge of the nature component that a controller is controlling). Thereby, a second component may replace a first component while a same controller that was controlling the first component may continue to be used to control the second component, after the replacement, without changing behavior of the controller or even, in some cases, without notifying the controller of the change. In some instances, components that are configured to include the I/O interface may be exchanged for one another without reconfiguring the I/O interface, the component, and/or the controller. In other words, the controller may be agnostic to the component on the other side of the I/O interface. To facilitate the agnosticism of the controller, the controller may receive a log file, which may comprise a sequence of events captured from online operation of an autonomous vehicle, user-defined timing, a default timing, sensor data, and/or other non-deterministic values, as discussed below.

The different types of controllers may all have the same core functionality, e.g., controlling input/output/execution of a component and doing so agnostically as to the function of the component it is controller. However, the different types of controllers may include different additional functions. For example, an online controller may route messages between controller(s) (associated with other component(s)) in addition to controlling the input/output/execution states of a component. For example, an online controller may include a subscriber component and a publisher component. The online controller may receive a message from another controller (i.e., a publishing/upstream controller) via the subscriber component from a network channel and/or topic to which the online controller subscribes (e.g., in a publish-subscribe (pub-sub) architecture). The online control may additionally or alternatively publish messages to one or more subscribing and/or downstream controllers via a network channel and/or topic. In some examples, a message may comprise an identifier of a topic and/or channel; a product of an execution of a component; a time ("generation time") at which a product was received at a controller from a component, a message including the product was created by the controller, and/or a message including the product was published; and/or a horizon time (e.g., a duration of time until a component would execute again at the earliest).

For example, a first component may output a first product, which a first online controller associated with the first component may receive via a first I/O interface between the first online controller and the first component. The first online controller may publish a message comprising the first product to a second online controller associated with a second component. The second online controller may provide, as input to the second component and via a second I/O interface between the second online controller and the second component, the first product and the second online controller may cause the second component to execute using the first product. The second online controller may receive, responsive to the second component executing, a second product. The second online controller may publish a second message to one or more subscribing controllers that includes the second product responsive to receiving the second product.

In some instances, an online controller may associate a generation time with messages that the online controller publishes. In some examples, an online controller may provide, as input to the component via the I/O interface, a clock signal, sensor data received from an autonomous vehicle, product(s) of one or more other components received at the online controller, and/or non-deterministic values usable by the component during execution. For example, non-deterministic values may include a random number distribution and/or any other values that may vary from execution to execution. In some instances, non-deterministic values may comprise sensor data and/or a product generated by another component. The online controller may generate the non-deterministic value based at least in part on receiving a call from the component for the non-deterministic and, upon generating the non-deterministic value, the online controller may provide the non-deterministic value to the component.

In some examples, the online controller may additionally or alternatively save, to a log file, events that occur at a component. For example, the online controller may save, in the log file, a sequence of events, sensor data provided as input to the component, other input provided to the component, non-deterministic values provided as input to the component by the controller, an output received from the component, diagnostic information regarding execution of the component, and/or keyframes received from the component. In some instances, the I/O interface may be configured to serialize an internal state of the component as a keyframe. The internal state may comprise hidden encapsulated data related to execution of an object such as internal variables that may not be passed as an output and/or that may not be recoverable from re-executing the component based on the last one to five messages. For example, the internal state may comprise a counter value, an internal variable value that is based at least in part on a previous execution of the first component, output context (e.g., a planner may generate a plurality of trajectories and select at least one to control an autonomous vehicle, and may keep a history of each position the vehicle was at relative to each execution of the planner and/or a position that was accomplished by the trajectory—this data may be taken into account in selecting a trajectory and, since this data records posterior activit(ies) and/or data, it would take multiple iterations to re-create the internal state at any particular execution of the planer), etc. In at least some examples, components may be designated as stateful (e.g., they depend on one or more variables previously calculated) and/or stateless (e.g., calculation performed by the component are independent of previous calculations). As above, stateful components may be designated as keeping a history of such internal states. In some examples, the I/O interface may generate a keyframe periodically (e.g., every 10 executions, every 500 executions, every 1,000 executions) and/or upon detecting a salient state (e.g., the internal state changes by a degree of change, compared to a previous internal state, that meets or exceeds a threshold degree of change; whenever the component generates a specified type of output).

In some examples, the sequence of events may define an order in which events occurred at a component and/or an order in which events at a component relative to event(s) at another component.

In order for subsequent replay of execution of a system to be deterministic and reproducible, as noted above, the online controller may capture the non-deterministic values generated by the controller and/or provided to the component associated therewith (e.g., random number distribution, sensor data, product determined by another component).

A reproducing controller may comprise the functionality of the online controller and may additionally or alternatively reproduce previous events at a component. To reproduce operation of a component similarly (within possible operating tolerances) to the manner in which the component operated previously, the reproducing controller may receive a log file (e.g., generated by an online controller and/or a logger associated therewith) that comprises a sequence of events and/or input data. In some instances, the log file may comprise one or more reproducibility messages previously generated by an online controller in associated with operation of the component.

In examples where the reproducing controller is being used to reproduce operation of the component that occurred at an autonomous vehicle (or some other online scenario), the reproducing controller may receive log file comprising a sequence of events that occurred during the scenario at the component (and/or a controller associated therewith) and/or one or more other controllers, and/or input data that may comprise sensor data from an autonomous vehicle, an output of an upstream component (although, in some cases, an output of an upstream component may not be used and/or saved in the log file), a keyframe, and/or non-deterministic value(s) provided to the component. In some instances, the sequence of events may comprise references to data stored in a data store that the reproducing controller may retrieve and supply as input to a component, according to the order specified by the sequence of events.

In some examples, the reproducing controller may communicate with other controllers and, to make the framework deterministic, able to reproduce scenarios, and/or portable, instead of allowing a component to output directly to the input of a downstream component, the reproducing controllers transmit messages between one another to simulate the flow of the pipeline.

For example, according to a native configuration (an original configuration of a data processing pipeline that isn't implementing the framework), a first component may receive sensor data from a sensor as input, execute based at least in part on the sensor data, and output a product of the execution to a second component (a downstream component), which receive the product as input, executes based at least in part on the product, and outputs a second product to another downstream component and/or outputs the second product. According to the framework discussed herein, a first controller may be associated with the first component and a second controller may be associated with the second component. Instead of allowing the components to receive input from other component(s), execute, and/or output a product to other component(s) directly, the first controller may receive the sensor data and determine when to provide the sensor data as input, when and for how long to allow the first component to execute, receive the product from the first component, and/or determine when to publish a message comprising the product to the second controller associated with the second component. In at least some examples, the framework may determine order of operations of various components based at least in part on the architecture of the system as a whole and optimize orders of computations to allow for maximum parallel compute between components while preserving order of operations of the system as a whole. Such order may be enforced and/or determined based on data in one or more messages.

The techniques discussed herein may allow a user to force component(s) to operate according to a different sequence of events (e.g., a user-specified sequence), whether by making a recorded sequence of events available for editing by the user, or by allowing a user to specify a sequence. The reproducing controller may receive a sequence of events that is based at least in part on user input (in addition to or instead of a sequence of events generated by an online controller). In some examples, the input data may additionally or alternatively comprise simulated sensor data generated by a simulation component and published to the reproducing controller from a controller associated with a simulation component.

To ensure that the framework operates deterministically, a controller may associate a generation time and/or horizon time with a message that the controller publishes and/or control an order of execution and/or order of messages provided as input to a component. The generation time may comprise an identifier of a time at which a product was received at the controller from the component, a time at which the controller generated a message including the product, and/or a time at which the controller published the message. The horizon time identifies a duration of until the controller will cause the component to execute, at the earliest. Essentially, the horizon time functions like a promise where the controller is telling another controller that the component won't execute again for another x duration of time (e.g., 500 milliseconds, 100 microseconds, 1.2 seconds).

A controller that receives a message comprising a generation time and/or horizon time may use the generation time and/or horizon time to determine when to provide input to and/or cause a component associated therewith to execute. For example, the controller may compare the generation time to a sequence of events and may, in some examples where the controller received multiple messages, re-order the messages to correspond to the sequence of events and provide the messages as input to the component in a same order as reflected in the sequence of events, thereby ensuring that the sequence of events is replicated (compared to the sequence of events recorded by an online controller, for example) at the component. In at least some examples, the time at and/or duration of an execution of a component may vary, so long as the order and/or total number of executions remains the same or similar. In some instances, the controller may additionally or alternatively determine a time and/or duration to allow the component to execute, based at least in part on the horizon time. For example, the controller may determine to cause the component to execute one or more times until the horizon time expires. In an example where the controller receives multiple messages and, therefore, multiple horizon times, the controller may determine to cause the component to execute one or more times until a minimum horizon time of the multiple horizon times and/or, at least, a horizon time that is less than a maximum horizon time of the multiple horizon times. By operating in such a manner, regarding the generation time (in respect to the sequence) and/or horizon time, the framework discussed herein may reproduce previous operation of a component and/or system, which may comprise preserving an order of operation and/or state of the component and/or system during operation.

Moreover, the framework allows the system to be portable by operating in a computing environment that comprises different hardware from an online (native) computing environment and the framework will cause the system to reproduce behavior that occurs in a native environment. Furthermore, the framework allows the system to be portable by being processed over a distributed computing system and/or by computing devices that are computationally limited. For example, because of the framework discussed herein and the attendant operations thereof, it doesn't matter if computing device(s) executing the controller and/or component are slower or faster than native computing device(s) and/or each other since the controllers control input/output/execution of a component according to the sequence of events, the generation time, and/or the horizon time. That way, no component is "getting ahead" of another component and no component is left without an input that it should receive before executing.

A coordinating controller may, instead of being associated with a specific component, coordinate interactions between multiple controllers. For example, a system, such as a perception system of an autonomous vehicle, may comprise a plurality of components that form a data processing pipeline according to a native configuration. In at least one example, a controller may be associated with a component of the plurality of components, although it is contemplated that one controller may alternatively be associated with multiple components. In some examples, some of the components of the plurality of components may not include the I/O interface and may therefore not be configured to interact with a controller. Components that do not include the I/O interface are referred to herein as "uncoordinated controllers." However, in some examples, each component of the plurality of components may be associated with a controller, so that the controller to component ratio is 1:1 (although other techniques are contemplated). In the native configuration, a specific component may receive input from one or more upstream components and may output to one or more downstream components. However, according to the techniques discussed herein, a component that includes the I/O interface may no longer communicate directly with other components, as in the native configuration, and may, instead, communicate exclusively via the I/O interface with the controller associated with the component. The controllers, in turn, may communicate between each other directly, according to the processing pipeline pattern, and/or via a coordinating controller.

In implementations that use a coordinating controller, the coordinating controller may receive a message published by a controller and may relay the message to subscribing controller(s) and/or may relay the message according to a sequence of events For example, the coordinating controller may ensure that a sequence is enforced by receiving a message from a first controller, determining a time at which to transmit the message to a second controller based at least in part on the sequence, and transmitting the message to the second controller at the time. Additionally or alternatively, the coordinating controller may handle messages destined for an uncoordinated component (e.g., a component that has no controller associated therewith). For example, the coordinating controller may receive a message from a controller, determine that the message is destined for at least one uncoordinated component, convert the message to an uncoordinated message type, and transmit the converted message to the uncoordinated component. This may allow a controller to be agnostic as to whether messages published by the controller are destined for a coordinated or uncoordinated component.

The arrangement of associating a controller with a component that comprises the I/O interface is referred to herein as a "framework." As discussed above, a framework may assign a controller to each component (of a system) that includes an I/O interface. If the system comprises uncoordinated components, the framework may additionally comprise a coordinating controller to handle interactions of the controllers with the uncoordinated components. By eschewing the native configuration of a pipeline and configuring the data pipeline according to the framework discussed herein, operation of the pipeline (within the framework) may be deterministic, portable, maximizes computational resources, and/or enables reproduction of complex scenarios on computationally-limited hardware.

The framework discussed herein may allow a pipeline to deterministically process a same input, meaning that every time the same input data (e.g., sensor data received from a vehicle) is provided to the framework, the framework will produce the same output every time. In some examples, the techniques discussed herein facilitate a first component being replaced with a second component within the framework. For example, a controller may be associated with the first component and, upon user-selection, the first component may be replaced with a second component, such that the first component is no longer associated with the controller and the second component is now associated with (and therefore controlled by/in communication with) the controller. For example, a first neural network might be replaced with a second neural network. This replacement may comprise loading the second component to a memory, pushing a process associated with the second component onto a stack, replacing an address associated with the first component with an address associated with the second component in a register to which the controller refers when causing a component to execute and/or in providing input/receiving output, etc. A "first system" may comprise the first component and/or other component(s) and a "second system" may comprise the second component, replaced for the first component, and/or the other component(s).

The techniques discussed herein may additionally or alternatively comprise determining a metric such as, for example, a precision, accuracy, precision-recall (PR) curve, receiver operating characteristic (ROC) curve, a latency, reaction time (e.g., a number of executions before identifying an object and/or track), and/or an acceleration (e.g., whether a lateral acceleration meets or exceeds a lateral acceleration threshold, whether a forward acceleration meets or exceeds a forward acceleration threshold associated with a perceived "jerk" of the vehicle), etc. associated with a product output by a system and/or a product output by a component. In some instances, the techniques may comprise determining precision, accuracy, PR curve, and/or ROC curve as a component executes and/or output is received from the system comprising the component.

In some instances, the techniques may comprise determining a first metric associated with a first system and/or a first component, replacing the first component with a second component to form a second system, and determining a second metric associated with the second system and/or the second component. In some instances, the techniques may additionally or alternatively determine a difference between the first system and the second system and/or the first component and/or the second component. In some instances, this may comprise comparing the metrics associated therewith. In some instances, the technique may comprise determining that the second metric is an improvement over the first metric, and transmitting, to an autonomous vehicle and based at least in part on the determination that the second metric is an improvement over the first metric, the second component and/or an instruction to replace the first component with the second component.

In some examples, the second metric may be an improvement over the first metric where the second metric indicates an accuracy and/or precision that meets or exceeds an accuracy and/or precision indicated by the first metric; the second metric indicates a PR curve, ROC curve, and/or acceleration that conforms more closely to an curve than a PR curve, ROC curve, and/or acceleration indicated by the first metric; and/or the second metric indicates a latency and/or reaction time that is less than a latency and/or reaction time indicated by the first metric.

In some instances, the techniques may comprise receiving a log file, processing the log file by a first system, determining metrics associated with the first system, determining that one or more first components stored in a memory correspond to one or more second components of the first system, and, based at least in part on the determining the correspondence, replacing at least one of the one or more first components with a corresponding one of the one or more second components. For example, in an interim between a last update to a system of an autonomous vehicle, a component may be modified. This second version of the component may be stored in a repository associated with versioning information. A computing device running the framework may determine that this modified component is available and corresponds to the previous component. The computing device may provide, as input to the first system, log data to reproduce behavior of the first system, replace a first component with a second version of the component to form a second system, and provide the log data as input to the second system to determine whether behavior of the second system diverges from the first system. The framework may force the first system and/or the second system to execute according to a sequence of events captured during online operation of a system and/or according to a simulated sequence of events.

The techniques described herein may improve the safety and efficiency of an autonomous vehicle by improving performance of the systems thereof. The techniques may also obviate a component that is hampering performance of a system and/or the techniques may facilitate advanced troubleshooting. The framework discussed herein may allow a data processing pipeline to be operated deterministically, even when the pipeline is operating on a non-native system and/or using computing devices of different capabilities, and/or to reproduce previous operations of the pipeline. Moreover, the framework may reduce the number of wasted computational cycles in executing the pipeline and/or may enable distributed execution of the pipeline (again, while remaining deterministic).

Example Scenario

FIG. 1 illustrates an example scenario 100 including an autonomous vehicle 102. According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, bariatric or other environmental signals, etc.

The autonomous vehicle 102 may provide the sensor data received from such sensor(s) 104 to one or more systems to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 102 within a map, perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more components. These component(s) may comprise software and/or hardware components. For example, a component may comprise a machine-learned model such as a neural network and/or other instructions executable by a processor.

For example, FIG. 1 depicts a native configuration (e.g., a data processing pipeline that is not operating using the framework described herein) of an example system 106 that may represent a simplified perception system. The example system 106 may receive, as an input, sensor data from the sensor(s) 104 and based at least in part on processing the sensor data by the example system 106, the example system 106 may output bounding box(es) 108 and/or semantic label 110. The bounding box(es) 108 and/or semantic label 110 may be a "product" 112 (i.e., an output generated responsive to operation of the example system 106) of example system 106.

According to the native configuration of the example system 106, the example system 106 may comprise a sensor data processor 114 which may receive, normalize, smooth, convert, and/or otherwise preliminarily process the sensor data. In some examples, the sensor data processor 114 may comprise sub-components such as, for example, a Gaussian filter, a digital-analog converter (DAC), a sensor driver, etc. The sensor data processor 114 may transmit output generated by the sensor data processor 114 to one or more downstream components, which, in the depicted example, may comprise a segmentation component 116 and a bounding box component 118. The segmentation component 116 may receive processed sensor data from the sensor data processor 114 (which is an upstream component in relation to the segmentation component 116) and may identify a portion of sensor data as being attributable to an object (e.g., labeling points of a LIDAR point cloud as being associated with an object, identifying pixels of an image, projecting LIDAR points onto an image and identifying projected points and/or pixels as being associated with an object). The segmentation component 116 may output the segmented sensor data to downstream components, which, in the depicted example, may comprise the bounding box component 118 and the semantic classification component 120.

The bounding box component 118 may receive inputs from upstream components, sensor data processor 14 and segmentation component 116. The bounding box component 118 may generate bounding box(es) 108 for one or more objects that are reflected in the processed sensor data and that correspond to the segmented sensor data received from the segmentation component. The bounding box may transmit the generated bounding box(es) 108 to downstream component(s), which may comprise an object identification component 122.

The semantic classification component 120 may generate a semantic label for a portion of sensor data that has been segmented, based at least in part on the segmented sensor data received from the segmentation component 116. For example, the semantic label may include a label such as the example semantic label 110, "4-Wheeled Vehicle," or any other semantic label that one or more machine-learned models of the semantic classification component 120 are configured to output upon evaluation (e.g., "pedestrian," "two-wheeled vehicle," "bicyclist," "parked vehicle").

The object identification component 122 may amalgamate a variety of inputs received from upstream components, including the bounding box(es) 108 output by the bounding box component 118 and/or the semantic labels of the semantic classification component 120 to output product 112 to one or more downstream components. For example, the product 112 may comprise an object identifier, formatted as a programming object usable by a planning system to generate a trajectory to control motion of the autonomous vehicle 102 and/or usable by a GUI component to generate a representation of the sensor data, the bounding box(es), and/or the semantic label 110, as depicted at 124.

It is contemplated that a perception system may, in some examples, include many more components and/or may conduct many more functions. For example, a perception system may include multiple components to detect objects from sensor data, multiple components to determine a classification of the objects, multiple components to determine a current and/or future heading, position, velocity, and/or acceleration of an object, multiple components to track object(s), multiple components to generate a map of the environment, multiple components to localize object(s) within the map, multiple components to determine a bounding box for an object, etc. For example, the segmentation component 116, by itself, may comprise multiple sub-components such as, for example, multiple machine-learned models, processor-executable instructions, and/or hardware (e.g., an FPGA and/or an ASIC).

The example system 106 is illustrated and explained above merely to give one skilled in the art context for what is meant by a "system," a "component," and/or sub-components.

Example Framework

Figure 2A:
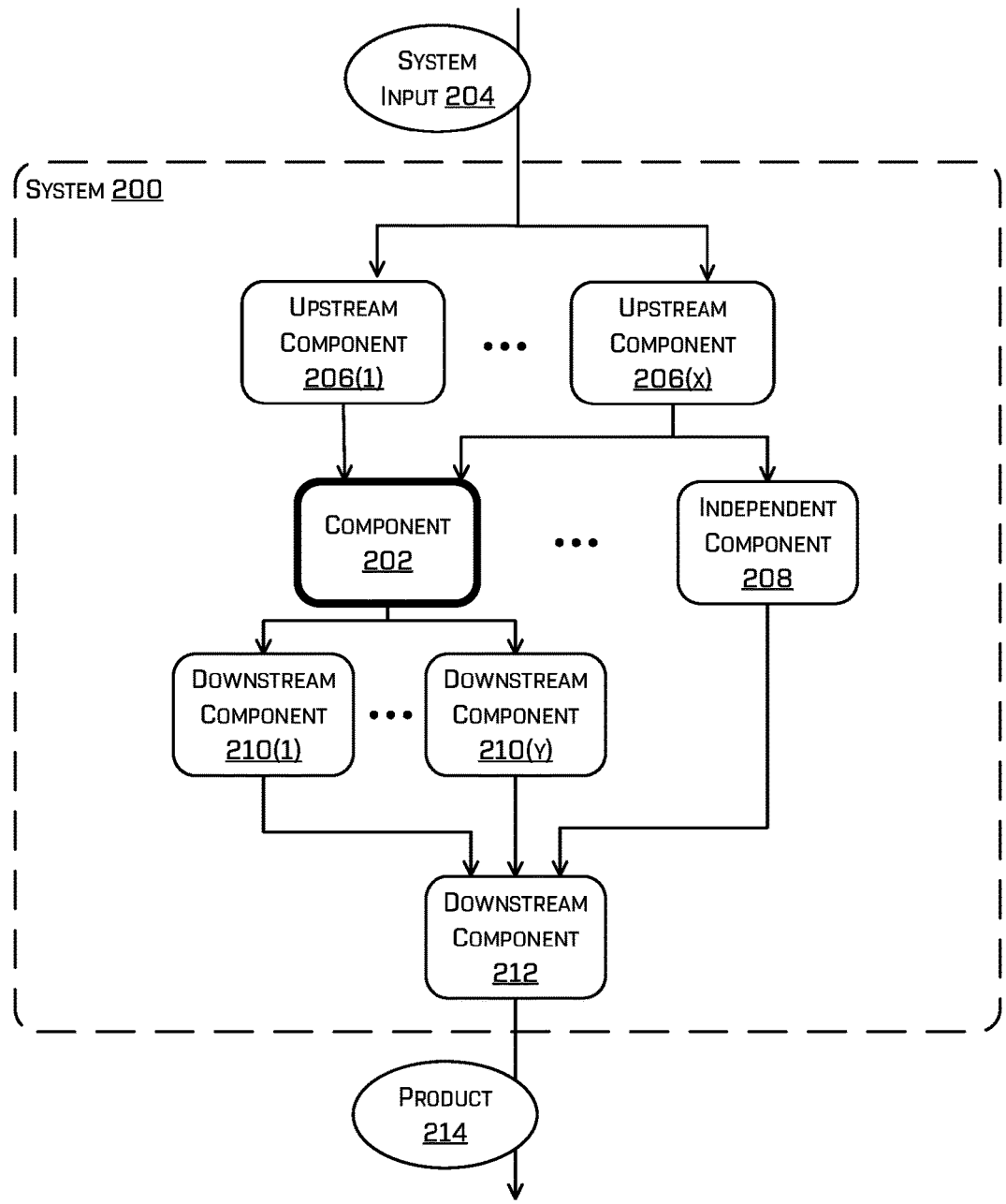
FIG. 2A illustrates a block diagram of an example system comprising one or more components in a native configuration.
Figure 2B:
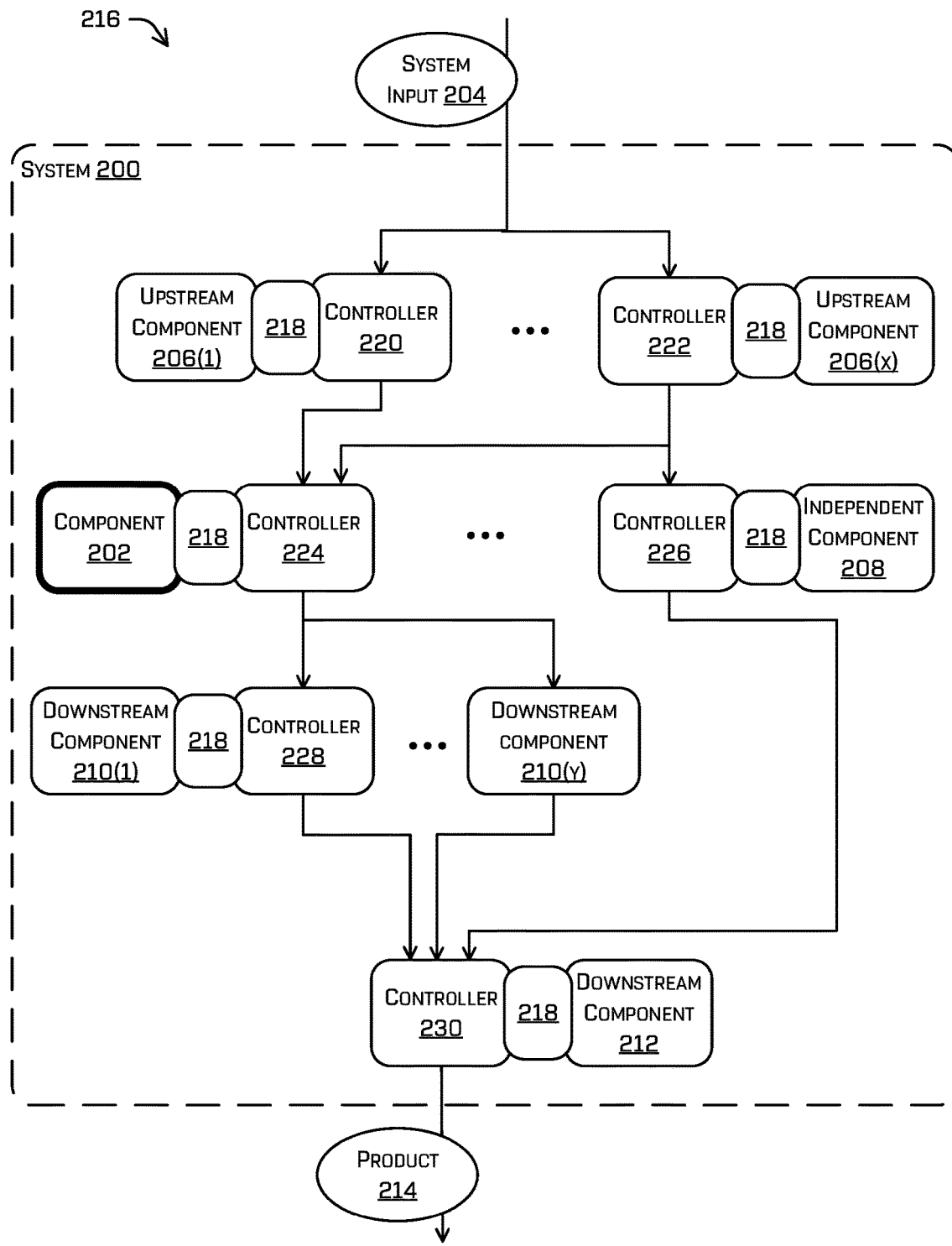
FIG. 2B illustrates a block diagram of an example framework for controlling input to, output from, and/or execution states of one or more components of a system.

FIG. 2A illustrates a block diagram of an example system 200 comprising one or more components configured according to a native configuration. The example system 200 is depicted primarily to contrast the native configuration with the framework described herein. FIGS. 2A and 2B are described from the perspective of component 202, which is emphasized with a bolded line.

The example system 200 configured according to a native configuration may receive system input 204. System input 204 may comprise sensor data, a product of another system, etc. This input may be processed by upstream component(s) 206(1)-(x). In some instances, component 202 may subscribe to output(s) of one or more of upstream component(s) 206(1)-(x) and/or otherwise receive output(s) of one or more of the upstream component(s) 206(1)-(x). Although FIG. 2B illustrates both component 206(1) and 206(x) as providing outputs to component 202, not every component in the first layer may necessarily provide output to the component 202. A first component may be "upstream" from a second component by providing output of the first component to the second component as input to the second component. Therefore, a component that receives the system input 204 and does not provide that component's output to component 202 may not be considered an "upstream" component from the perspective of component 202. For example, from the perspective of independent component 208, component 206(1) is not an upstream component to independent component 208 since the independent component 208 does not receive, as input to the independent component 208, an output generated by component 206(1).

The independent component 208 is independent from the component 202 in that the output of independent component 208 does not affect output of component 202, whereas the operation of component 202 is based at least in part on the product(s) of at least upstream components 206(1) and 206(x).

Based at least in part on receiving, as input, product(s) from upstream components 206(1) and/or 206(x), component 202 may execute and, responsive to executing, may generate an output. The component 202 may provide this output to downstream component(s) 210(1)-(y), e.g., by publishing the output via a topic and/or channel to which the downstream component(s) 210(1)-(y) subscribe. Again, these downstream component(s) 210(1)-(y) may receive, as input, the output of component 202 and execute based at least in part on the output of component 202, generating respective output(s), which downstream component(s) 210(1)-(y) may transmit to subsequent downstream component 212 and so on. In some instances, downstream component 212 may exist in a last layer of the system 200, such that output from downstream component 212 is a product 214 of the system 200. For example, if system 200 were a planning system of an autonomous vehicle, product 214 may comprise a trajectory (e.g., a speed, steering angle, and/or steering angle rate) or, if system 200 were a perception system, product 214 may comprise an object list comprising a position, velocity, acceleration, and/or a classification of a detected object.

FIG. 2B illustrates a block diagram of an example framework 216 for controlling input to, output from, and/or execution states of one or more components of system 200. In some instances, to implement the framework, an I/O interface 218 (termed "I/O 218" in FIG. 2B for brevity) may be included in component(s) for which deterministic reproduction and testing is desired and/or that may exhibit non-deterministic behavior. In some instances, implementing the example framework 216 may comprise associating a controller (220-230) with each component that is to be controlled via the example framework 216. In some instances, a controller may be assigned to each component of system 200 that comprises the I/O interface 218 at a 1:1 ratio, although other arrangements are contemplated (e.g., one controller that is associated with three components, one controller that is associated with components in one layer of the pipeline, one controller that is associated with components of a specified type in the system 200). The example framework 216 depicted in FIG. 2B illustrates a 1:1 ratio.

Instead of allowing components to receive input(s), execute, and/or provide output(s) to other components at any time, the controllers 220-230 may control these and other functions. The controllers 220-230 may comprise controllers of different types, and the controllers 220-230 may control input to a component with which a respective controller is associated, an execution state of that component, and/or output from that component to subscribing (downstream) component(s). In some examples, a component that is controlled by a controller (e.g., component 202 is controlled by controller 224) may be isolated from the other components and the controller associated therewith may provide the inputs to and outputs from the component, as prescribed by the processing pipeline.

However, components that do not comprise the I/O interface 218, such as downstream component 210(y), may receive input, execute, and/or transmit output according to the native configuration. This type of component is referred to herein as an "uncoordinated component." In some instances, a special type of controller, a coordinating controller, may ensure that outputs from a coordinated controller are properly received by an uncoordinated controller (e.g., this may comprise determining a time at which to provide an input to the uncoordinated controller, converting a message type to a message type usable by the uncoordinated controller). Subsequent figures explain in more detail interactions of a controller with an I/O interface 218 and/or the component with which the controller is associated.

In some instances, the controllers 220-230 may receive data from and/or transmit data to other one(s) of the controllers 220-230 via one or more middleware(s) and/or network topologies. For example, component 202 may be associated with a first process executed on first hardware. Controller 224 may receive and/or transmit data:

via a first type of middleware (e.g., data distribution service (DDS)) with a second controller that is associated with a component running on second hardware and/or using a different software language, via a second type of middleware (e.g., Robot Operating System (ROS), inter-process communication (IPC) tools of an operating system) with a third controller that is associated with a component running on the first hardware and/or associated with a second process, via a third type of middleware (e.g., InProcess) with a third controller that is associated with a component that is also associated with the first process, etc.

In other words, the controller 220-230 may be configured to receive and/or transmit data to other controllers associated with different computing context(s) and/or over different middleware(s)/different implementations of inter-process communication (IPC). For example, during online operation, controller 302 may have received a message via an operating system's IPC, but during reproduction of an online scenario, as discussed below, the controller 302 may read the message from a computer-readable media (e.g., this may comprise decoding a video file and/or replaying one frame of the video frame at a time).

Example Framework Operations

FIGS. 3-6 illustrate block diagrams of a component 300, I/O interface 302, and different types of controllers and respective components and functions of the different types of controllers. In some examples, the component 300 may comprise instructions 306. Instructions 306 are depicted as including a neural network 308, although the instructions 306 may additionally or alternatively include processor-executable instructions. Although not depicted for simplicity, component 300 may additionally or alternatively comprise hardware such as, for example, a DAC, ASIC, FPGA, etc.

In some examples, the I/O interface 302 may comprise an initialization input interface 310, an execution input interface 312, an output interface 314, a save keyframe output interface 316, and/or a load keyframe input interface 318. In general, the initialization input interface 310 receives one or more variables from a controller and provides them, as input, to the instructions 306 so that execution of the instructions 306 may be based at least in part on the one or more variables. In some instances, the initialization input interface 310 may be configured to set an initial state of the component 300 and/or instructions 306 and/or provide initial variable(s) to the instructions 306, and in additional or alternate examples, the initialization input interface 310 may receive variable(s) 334 from a controller and may provide them as input to the instructions 306 at any point in execution of the instructions 306 (e.g., before execution, during execution, based at least in part on receiving a request for a variable from the instructions 306). In at least some examples, such variables may be passed via another interface (e.g., besides the initialization input interface 310). The execution input interface 312 may receive an instruction to execute from a controller and cause the component 300 to execute and, otherwise without receiving the instruction, pause or prevent the component 300 from executing. The output interface 314 may receive a product of an execution of the instructions 306 and provide the product to a controller. The save keyframe output interface 316 may cause the component 300 to serialize an internal state of the component 300 as a keyframe and output the keyframe to a controller. For example, the internal state may comprise a counter value, output context (e.g., a planner may generate a plurality of trajectories and select at least one to control an autonomous vehicle, and may keep a history of each position the vehicle was at relative to each execution of the planner and/or a position that was accomplished by the trajectory—this data may be taken into account in selecting a trajectory and, since this data records posterior activit(ies) and/or data, it would take multiple iterations to re-create the internal state at any particular execution of the planner), etc. The load keyframe input interface 318 may receive a keyframe from a controller and may cause the component 300 to deserialize the keyframe and cause an internal state of the component 300 to be set to an internal state specified by the deserialized keyframe. Loading a keyframe may allow a developer to skip to a discrete ("n-th") execution of a component and to accurately reproduce behavior of the component during that discrete execution while preserving the determinism of the execution and without having to go back and re-execute all of the components from the beginning or a last few executions in order for the internal state to be accurately set so that determinism may be preserved. For example, an internal state of a component may be dependent on a last m number of executions of the component itself and/or other component(s). By merely jumping to an "n-th" execution of the component and providing the correcting inputs to the component without setting the internal state of the component, execution of the component would not accurately reproduce behavior of the component nor would determinism be preserved since the internal state may be dependent on non-deterministic elements. In some examples, a keyframe may specify a discrete execution with which the keyframe is associated (e.g., by associating the keyframe with a generation time). In another example, a user wishing to see the 98th time step of execution may effectively "fast-forward" to the nearest keyframe (e.g., as stored at the 95th time step) and simply step forward three units in time.

Figure 3:
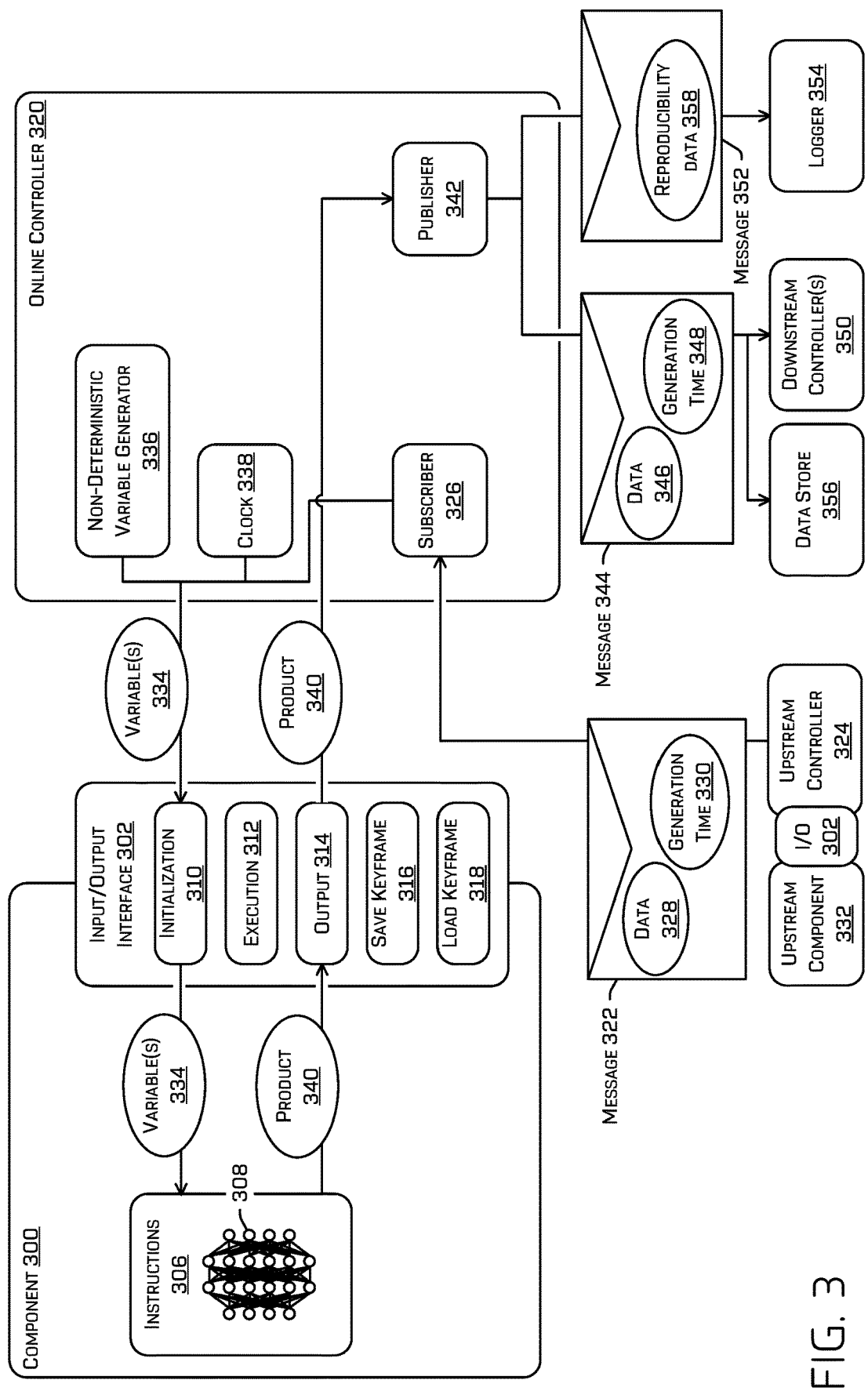
FIG. 3 illustrates a block diagram of a framework implementation comprising a component, I/O interface, and an online controller.

FIG. 3 illustrates a block diagram of the component 300, 110 interface 302, and an online controller 320. The online controller may be a controller implemented during real-time execution of a system. For example, online controller 320 may be used on an autonomous vehicle to provide messages from upstream controller(s) to the component 300, from the component 300 to downstream controller(s), thereby abstracting the input/output functionalities of the component 300, and/or to control when the component 300 executes. The online controller 320 may also be considered a baseline controller, as other controller type(s) may include one or more of the components and/or functions of the online controller 320.

In some examples, the online controller 320 may receive a message 322 from an upstream controller 324 at a subscriber 326 of the online controller 320. According to the examples discussed herein, the framework may comprise a publish—subscribe architecture between controllers so that controllers do not need to specifically address another controller and so that a pipeline flow can easily be modified by directing the subscriber 326 of a controller to remove and/or add a subscription to a channel and/or topic. For the sake of clarity, this is the only architecture discussed herein for relaying an output from a component to another controller, although it is understood that any other suitable transmission protocol may be implemented.

Regardless, subscriber 326 may receive the message 322 and determine that message 322 comprises data 328 and/or generation time 330. The generation time may comprise an identifier of a time at which a product (e.g., associated with data 328) was received at the upstream controller 324 from the upstream component 332 associated therewith, a time at which the upstream controller 324 generated the message 322, a monotonically increasing value that uniquely identifies the upstream component 332 and a particular execution that resulted in message 322, and/or a time at which the upstream controller 324 published the message 322. In some instances, data 328 may comprise a product of an execution of upstream component 332 associated with upstream controller 324.

Subscriber 326 may provide data 328, or at least a portion thereof, to the initialization input interface 310 as one of one or more variable(s) 334 provided from the online controller 320 to the initialization input interface 310. Variable(s) 334 may include values usable by instructions 306 to execute. For example, the instructions 306 may comprise a process configured to receive a Gaussian random number distribution, a LIDAR point cloud, and a covariance matrix and a neural network that is configured to receive the LIDAR point cloud and a semantic label. The online controller 320 may generate a non-deterministic variable value at a non-deterministic variable generator 336. For example, this may comprise generating a random number distribution, etc. In other words, instead of allowing the component 300 to generate a value that could not be deterministically reproduced, the non-deterministic variable generator 336 may generate the value. Moreover, a clock 338 may additionally or alternatively provide a clock signal to the initialization input interface 310 as one of the variable(s) 334.

When a component 300 is controlled by an online controller 320, in some instances, the online controller 320 may control when and/or how long the component 300 operates. For example, the online controller 320 may perform a callback via the execution interface 312, e.g., by providing executable code to the component 300 that may cause the component 300 to execute based at least in part on the executable code provided to the component 300 and/or may comprise variable(s) 334, in some examples. In some examples, the callback may be a synchronous callback, but it is contemplated that the callback may be asynchronous, so long as the online controller 320 controls when the component 300 executes. In additional or alternate examples, the online controller 320 may set the execution input interface 312 to a "high" value, thereby allowing the component 300 to execute once it receives, via the initialization input interface 310, the variable(s) 334. In some examples, the execution input interface 312 may comprise a flag in a register where the online controller 320 may set the flag to a "high" flag value indicating that the component 300 may execute and/or that causes the component 300 to execute based at least in part on the variable(s) 334 received via the initialization input interface 310. Contrarily, a "low" flag value may pause and/or prevent the component 300 from executing until the flag transitions to a "high" value. In an additional or alternate example, the online controller 320 may push an address associated with the instructions 306 onto a stack to cause the component 300 to execute and/or the online controller 320 may call or otherwise notify the execution input interface 312, which, in response, may push the address onto the stack. Once on the stack, one or more processors may execute instructions associated with address upon reaching the address in the stack. In the latter example, the component 300 may transmit the address (and/or any other pertinent addresses if the component 300 comprises multiple sub-components) to the execution input interface 312 in preparation for the execution input interface 312 to push the address onto the stack for execution by one or more processors.

In an additional or alternate example, where an online controller 320 is associated with the component 300, the online controller 320 may cause the component 300 to execute periodically (e.g., at 30 MHz, at 500 MHz, at 1 GHz) and/or when the subscriber 326 determines that message(s) have been received from all the upstream controller(s) to which the online controller 320 subscribes since the last execution of the component 300.

The output interface 314 may receive a product 340 of execution of the component 300 and provide the product 340 to a publisher 342 of the online controller 320. Based at least in part on receiving the product 340, the publisher 342 may generate a message 344 comprising data 346 (e.g., which may include the product 340 and/or a representation thereof) and/or a generation time 348. The publisher 342 may also include appropriate routing information with the message 344 such as, for example, a channel identifier and/or a topic identifier for a pub-sub architecture. The publisher 342 may publish the message 344 and the message 344 may be received by subscribing (downstream) controller(s) 350. It is understood that, although this application predominantly discusses use of a pub-sub architecture to transmit an output of one component to an input of another component, other network configurations are contemplated, and/or otherwise establish the pipeline configuration. Other network configurations may include, for example, allocating a static IP addresses to a controller and/or uncoordinated component, addressing controller(s) and/or uncoordinated components using a virtual routing and forwarding (VRF) scheme, etc.

In some instances, the publisher 342 may publish a reproducibility message 352 in addition to message 344 (or instead of message 344 if the component 300 is a sink, i.e., the component 300 digests an input but does not send an output to another controller/component). In some instances, the reproducibility message 352 may be received by a logger 354 that receives reproducibility message(s) from one or more components over a logging channel that is different than a channel for data messages (a "data channel"). Messages 322 and 344 may be examples of data messages. In some instances, a data store 356 may "listen" to the data channel, thereby receiving one or more data message(s), such as message 322 and/or message 344. The data store 356 may, in some examples, store messages received over the data channel. A reproduction controller may use the reproducibility message(s) stored by the logger 354 and/or data message(s) stored by the data store 356 to deterministically reproduce behavior of the component 300. In some instances, the online controller 320 may operate as a pure transport layer and may not generate reproducibility message(s).

In some instances, reproducibility message 352 may comprise reproducibility data 358. In some instances, the reproducibility data 358 may comprise information sufficient to reproduce a particular operation of the component 300 (e.g., information sufficient to re-run a specific execution of the instructions 306, such as the last execution that resulted in outputting product 340 and/or publishing message 344) and/or provide an indication of order of operation (e.g., execution) of components.

Figure 4:
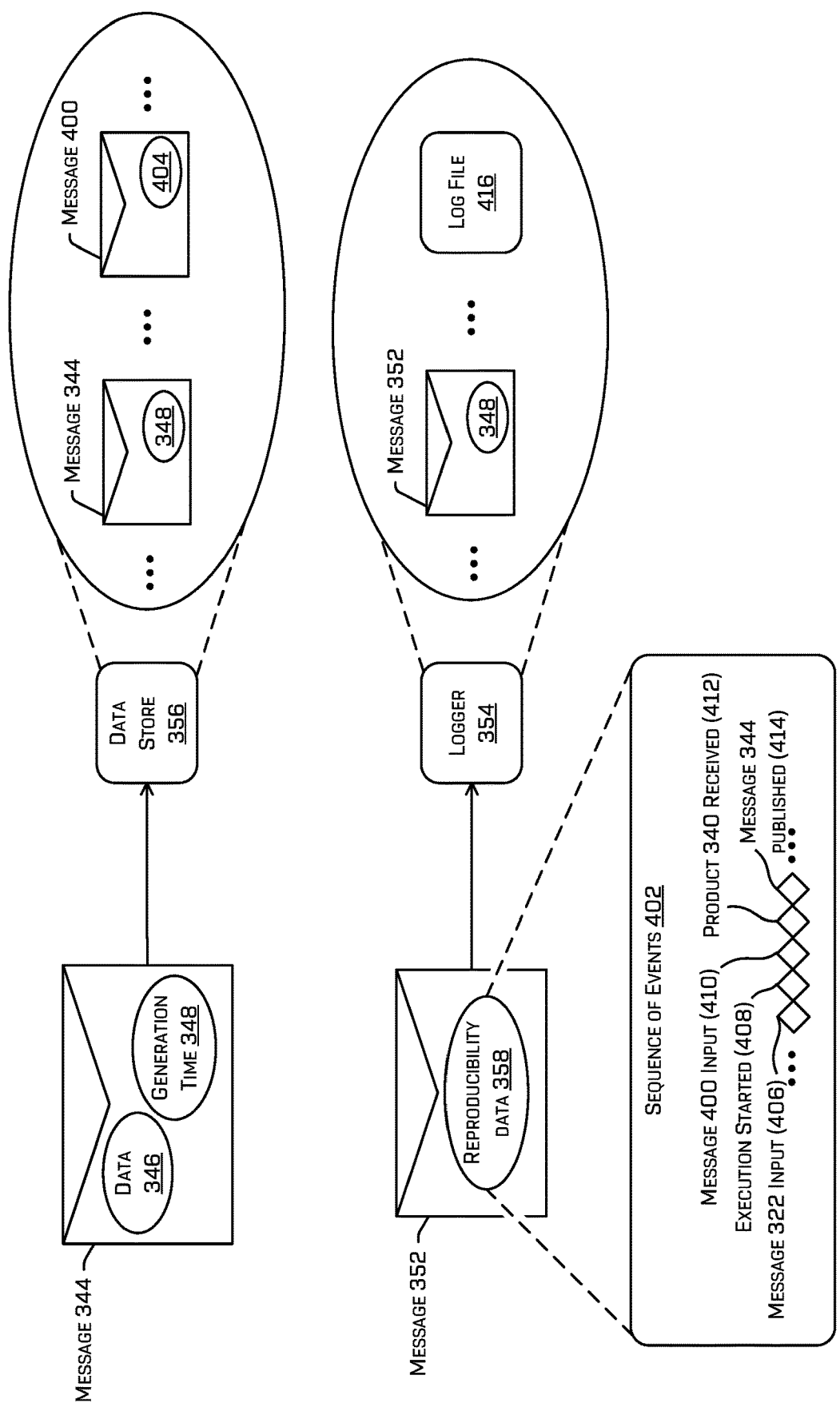
FIG. 4 illustrates a block diagram of an example architecture for implementing a data store and logger for reproducing events at a component.

FIG. 4 illustrates a block diagram of a data store 356 and a logger 354 and respective data received, generated, and/or stored thereby. In some examples, data store 356 may receive data messages, such as message 344, published by a controller over a data channel and logger 354 may receive reproducibility messages, such as reproducibility message 352, over a logging channel. In some instances, the data store 356 may store any received data messages (e.g., message(s) 344 through 400, which may be received from one or more controllers associated with one or more components) in a data repository, such as on a non-transitory computer-readable medium, and/or the data store 356$k$ may additionally or alternatively store reproducibility message(s) received via the logging channel and/or received from the logger 354.

In some instances, a data message, such as message 344, may include a generation time 348 and data 346 comprising a product 340 of an execution of the component 300. In some instances, the generation time 348 may comprise a monotonically increasing value that uniquely identifies the component that generated the message and/or a particular execution of the component that resulted in message 322. For example, where the component 300 has executed a 3,462$^{nd}$ time, the generation time 348 may comprise an identifier of the 3,462$^{nd}$ execution by the component and, in some examples, a discrete identifier of the component itself.

In some instances, a reproducibility message, such as reproducibility message 352, may include the same identifier as the message 344 corresponding therewith and/or may otherwise be identified as being associated with message 344. In some instances, the reproducibility data 358 may comprise information sufficient to deterministically reproduce behavior of the component 300. For example, reproducibility data 358 may comprise a sequence of events 402, non-deterministic values generated by the non-deterministic variable generator 336 and/or provided as input to the component by the controller, diagnostic information regarding execution of the component (e.g., an execution duration of time, a number of core(s) and/or threads devoted to executing the component, a status of execution of the component (e.g., success, failed, paused)), and/or a keyframe received from the component. As a non-limiting example, reproducibility data 358 may comprise information about what variables/components are needed to perform computations such that, upon replay, order of computations can be preserved.

In some examples, the sequence of events 402 may comprise an order in which events occurred at the component 300 (and/or I/O interface 302 and/or online controller 320) and/or an order in which events occur at the component 300 relative to event(s) at another component. For example, the sequence of events 402 may define an order in which an input phase, execution phase, and/or output phase happened at the component (in some instances relative to the input phase, execution phase, and/or output phase at another component). For example, the input phase may comprise providing input to the component (e.g., via the initialization input interface 310, the execution input interface 312, and/or the load keyframe input interface 318), which may comprise an order of message(s) and/or variable(s) provided to the component, an order in which message(s) were received at a controller, etc; the execution phase may comprise a delay between receiving a message and/or providing input to the component and causing the component to execute, a relative time (e.g., relative to other event(s) at another controller) that the controller caused the component to start executing, a duration of time for which the component executed and/or a number of executions of the component, a relative time at which execution terminated and/or an output was received from the component, etc; and the output phase may comprise receiving an output from the component (e.g., whether a product of execution and/or a keyframe), generating a message including the output, and/or publishing the message. The sequence of events 402 may additionally or alternatively identify an order in which the online controller 320 provided message(s) as input to the component and/or an identifier of the message(s) provided as input, such as generation time 348 and/or 404. The identifier of the message(s) may correspond to one or more message(s) stored in the data store 356. In an additional or alternate example, the sequence of events 402 may identify message 344 as output associated with reproducibility message 352 (e.g., by including the generation time 348 of message 344 in an output field of the sequence of events 402).

For example, FIG. 4 depicts a sequence of events 402 related to message 344 and comprising an order of operations at component 300 and an identification of message(s) related thereto. For example, sequence of events 402 identifies that online controller 320 input message 322 to the component (406) (potentially as an initialization parameter since this occurred before the execute commend was given at 410) before online controller 320 caused the component 300 to start executing at 408 via the execution interface 312. Subsequent to execution of component 300 at 408, the online controller 320 provided message 400 as input to the component 300 at 410, then product 340 was received via output interface 314 at 412, then the online controller 320 published message 344 at 414.

In some examples, in addition to the order identified by the sequence of events 402, the sequence of events may identify a message associated therewith that is stored in the data store (e.g., identified via generation time and/or unique identifier, the identified message may have been provided to the component 300 as input, the identified message was output by the component responsive to execution), identify and/or store non-deterministic data such as non-deterministic variable value(s) provided to the component 300, clock data provided to the component, etc. For example, the sequence of events 402, at 406, may not only identify the relative order of providing message 322 as input, but may include generation time 330 and/or some other identifier suitable to retrieve message 322 from data store 356.

Note that, although the sequence of events 402 depicts messages input, starting an execution, receiving a product, and publishing a message, it is contemplated that any of the I/O interface 302 and/or online controller 320 operations discussed herein may be recorded by the sequence of events 402—e.g., any portion of the input phase, execution phase, and/or output phase discussed herein, the order thereof, a reference to data relevant thereto (e.g., when the data is stored in the data store 356), and/or the data itself, if the data store 356 doesn't store the data and/or the data is present in a reproducibility message and/or the log file 416. For example, variable(s) 334, product 340, any non-deterministic variable values provided to the component, clock data, etc. may be stored in data store 356 and referenced by a sequence of events 402. To give another example, the sequence of events 402 may indicate an order in which message(s) are provided to the component 300 relative to waypoints in execution of the component 300 (e.g., requests received from the component 300 responsive to executing, a message received from the component 300 marking a waypoint, output of a product by the component 300).

In some instances, logger 354 may store reproducibility message(s) received at the logger 354. Each reproducibility message stored by the logger 354 may comprise respective sequences of events, non-deterministic variable values, clock data generated by a clock of a controller (e.g., a duration until, a delay between, and/or a time at which various events occurred), and/or keyframe(s) associated with an execution of the component(s) associated therewith. In an additional or alternate example, the logger 354 may generate a log file 406 based at least in part on the reproducibility message(s) received at the logger 354. The log file 406 may comprise a total sequence of events generated from the respective sequences of events indicated by the reproducibility message(s) received at the logger 354 for a particular component. In some instances, the logger 354 may generate a log file for each component of a system so that each component has a sequence of events associated therewith that identifies an order and/or associated message(s) (and/or other non-deterministic data such as non-deterministic variable value(s), clock data, keyframes, etc.). In an additional or alternate example, the logger 354 may generate a total sequence of events that reflects an order of events at two or more components, based at least in part on sequences received from controllers associated with the two or more components. In other words, the log file 416 may comprise a sequence events that reflects an order of events at two or more components of a system, up to all of the components of a system, so that the events are ordered with respect to all the components. In an additional or alternate example, the log file 406 may additionally comprise the data 346 and/or generation time 348. In some examples, the log file 406 may comprise the reproducibility message(s) received from a controller associated with a component. In some instances, logger 354 may be part of online controller 320.

Figure 5:
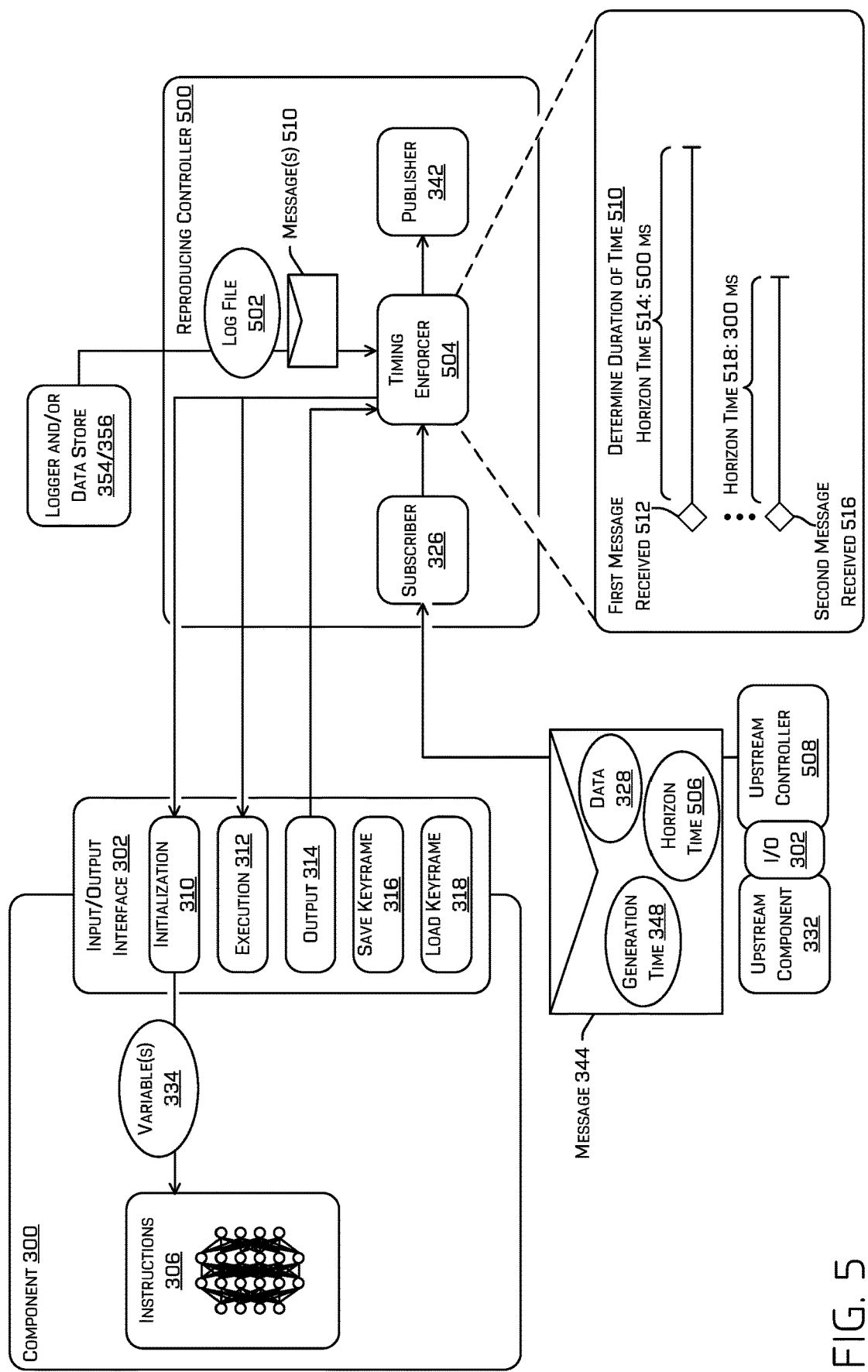
FIG. 5 illustrates a block diagram of a framework implementation comprising a component, I/O interface, and a reproducing controller.

FIG. 4 illustrates a block diagram of the component 300, I/O interface 302, and a reproducing controller 400. FIG. 4 repeats an input phase depicted in FIG. 3 and elaborates on additional or alternative functions and/or components that may be included in a reproducing controller 400. FIG. 5 continues the discussion of the reproducing controller 400 regarding the execution and/or output phase of FIG. 3. The reproducing controller 400 may operate with the purpose of capturing behavior of the component 300 in such a way that behavior of the component 300 may be reproduced as nearly as possible to the manner in which the behavior occurred when it was captured and to reproduce the behavior deterministically. FIG. 5 illustrates a block diagram of the component 300, I/O interface 302, and a reproducing controller 500. In some instances, the reproducing controller 500 may comprise one or more of the components and/or functionalities of the online controller 320 and may additionally or alternatively reproduce previous events at a component deterministically and portably. The reproducing controller 500 may receive a log file 502, which may represent log file 416 and/or another log file. For example, online controller 320 (and/or a logger 354 associated therewith) may generate the log file 502 and save and/or transmit it to a memory accessible by the reproducing controller 500. In some instances, the log file 502 may comprise the sequence of events 402. In some instances, at the instantiation of the reproducing controller 500, the reproducing controller 500 may provide a unique identifier associated with the component 300 in order to retrieve the log file 502.

In some examples, reproducing controller 500 may comprise a timing enforcer 504 that synchronizes behaviors/events at the component 300 so that operation of a system that encompasses component 300 may be reproduced deterministically, potentially in non-real time in some instances (e.g., operating more quickly or slowly than online hardware may operate, operating on different kinds of hardware with different computing resource capabilities and/or functionalities). Since different components of a system may take different lengths of time to execute, a global clock to synchronize executions of the components of the system is insufficient to ensure that each component has the inputs it uses to execute/that each component doesn't receive an input it should have received for an execution after the execution occurs.

Moreover, the system may be configured to operate on different types of software and/or the framework may distribute processing of the system over nodes of a distributed computing system that may comprise hardware of different capabilities and therefore operating speeds and/or functionalities. For example, one component may comprise a sub-component process that that runs on a central processing unit (CPU) whereas a second component may comprise thousands of sub-component threads executable by graphics processing unit (GPU) cores/pipeline(s). Not only will sub-components differ in complexity and run-time, but the CPU and GPU may include different computing resource management functionalities that exhibit different behaviors when computing resources aren't available to process a sub-component. For example, a CPU may include process management such as an advanced scheduler and/or hyper-threading which may block a process from executing until the computing resources become available, but the GPU may include a more rudimentary system that may cause a thread to fail if computing resources aren't available. Because of this, the system may not be reproduced accurately if the native process management functions of the CPU, GPU, and/or other processor(s) control scheduling of the component(s).

The framework discussed herein, including the timing enforcer 504, may allow a component to be out of sync with respect to time as recorded by another controller, but may control the timing of input to, output from, and/or execution of a component so that operation of the system as a whole remains deterministic, components receiving the inputs they use before they execute. The framework may reproduce events at the components in a same order as occurred at a time the events were recorded, even when components do not keep a common time. In some instances, the controller(s) of the framework may comprise separate clocks for each of the components, which are allowed to be and/or become out of sync.

To overcome the issues discussed above that may result from non-simultaneous/non-synchronous execution of the components, messages transmitted between reproducing controllers may further comprise data sufficient to synchronize controllers retroactively, such as a generation time and/or a horizon time. For example, upstream controller 508 may comprise a reproducing controller, the publisher of which generates and publishes message 344 to include data 328, generation time 348, and/or horizon time 506. In some examples, the horizon time 506 may be provided in the message 344 to indicate that a next execution of the component 300 cannot be affected by the results of an execution of upstream component 332 which hasn't been performed yet.

In some examples, the generation time and/or the horizon time may monotonically increase. In another example, the horizon time may comprise a duration of time and/or a number of executions and may not monotonically increase. In some examples, the horizon time 506 may be adjusted to account for a delay in delivery of the message 344 to component 300 and/or reproducing controller 500. In some examples, the horizon time may define an earliest time at which a component will execute and/or a next message will be published by the controller responsive to execution of the component. The horizon time may be a lower bound, meaning the actual publication time may be later than the horizon time. In some examples, reproducing controller 500 may publish, by publisher 342, a first message comprising a product of execution of the component 300 and a first generation time identifying an estimated earliest time that the publisher 342 will publish the next message responsive to execution of the component 300. In some examples, the publisher 342 may publish a second message before the component 300 executes again to update the horizon time if the timing enforcer 504 determines that the earliest time is later than previously estimated. This may maximize computational resource usage across the framework. The second message may forego inclusion of a product since the component 300 hasn't executed again yet.

In some instances, the timing enforcer 504 may cause execution of the component 300 (e.g. via execution input interface 312) based at least in part on receiving a message (i.e., a message-based execution) and/or determining that a time period has passed (i.e., a time-based execution) since the previous time-based execution. An execution of the component may be defined by a time the execution occurs (whether it is a message-based execution and/or a time-based execution), the component's internal state immediately prior to the execution, and a set of messages that are provided, via the initialization input interface 310, to the component 300 during/at the time of execution. The timing enforcer 504 may be configured with rules to retroactively ensure that the component 300 is synced. The rules may comprise causing an execution of the component 300 upon determining that: (1) a future event could not change the time that the execution occurs (e.g., the execution is time-safe), (2) a future event could not change the set of messages that are presented to the component at/during execution (e.g., the execution is message-safe), and (3) a future event could not change the internal state that the component holds immediately prior to the execution (e.g., the execution is state-safe). The timing enforcer 504 may cause the component 300 to pause (e.g., maintain an internal state, prevent the internal state of the component 300 from changing in between executions, and/or prevent instructions associated with the component 300 from being executed) until the timing enforcer 504 determines to cause the component 300 to execute.

In some instances, a message-based execution may be based at least in part on receiving one or more messages from subscriber(s) that trigger a next execution of the component 300. For example, the timing enforcer 504 may determine that the component 300 may be configured to receive a first set of messages from a first and second publishing controller and a second set of messages from a third publishing controller, where the component 300 may use either or both sets to execute. The component 300 may output an indication of the set of messages via the initialization input interface 310. In an additional or alternate example, a sequence of events of the log file 502 may indicate a message upon which an execution was based. The timing enforcer 504 may thereby "expect" reception of message(s) to fulfill a set of messages usable by the component 300 to execute. Accordingly, the timing enforcer 504 may cause the component 300 to execute upon determining that the subscriber 326 has received all of the message(s) to fulfill the first set and/or the second set. The timing enforcer 504 may also cause the message(s) fulfilling the first set and/or second set to be provided to the component 300 via the initialization input interface 310. In some instances, a set may comprise a single message from a single publisher, although it is contemplated that a set may comprise multiple messages from a single publisher and/or multiple publishers.

In some examples, the timing enforcer 504 may additionally or alternatively determine the next time at which to cause the component to execute based at least in part on determining a minimum time of a time of the next time-based execution or the lesser of a horizon time and a next message publish time). This may be represented as: (next execution time)=min((next timing-based execution) U (horizon time, next message publish time): for each publisher that triggers an execution))).

In some instances, the timing enforcer 504 may additionally or alternatively determine a duration of time (510) for which the timing enforcer 504 may cause and/or allow the component 300 to execute. For example, timing enforcer 504 may cause the component 300 to execute one or more times until expiration of the duration of time. In some instances, the timing enforcer 504 may determine that the duration of time corresponds to the horizon time 506. However, multiple messages may be received at the subscriber 326 that may comprise different horizon times. For example, FIG. 5 depicts receiving a first message at 512 that comprises a horizon time 514 of 500 milliseconds and receiving a second message at 516 that comprises a horizon time 518 of 300 milliseconds. In this example, the rules configuring the timing enforcer 504 may determine that the duration of time to execute the component 300 may be less than or equal to the horizon time 518 of 300 milliseconds since it is the minimum time. This may be the case because executing the component 300 for longer than 300 milliseconds may risk compromising the time-safety, message-safety, and/or execution safety of the execution. In some examples, the timing enforcer 504 may prevent the component 300 from executing even if the duration has not expired yet if a next execution would use a message that has not been received yet.

In some instances, the timing enforcer 504 may additionally or alternatively order messages and/or sets of messages provided to the component 300 as input based at least in part generation times and/or horizon times associated with the messages and/or a sequence of events retrieved from the log file 502. For example, the upstream component 332 may execute more quickly and/or regularly than component 300, therefore, subscriber 326 may have multiple messages from the upstream controller 508 before a next execution of the component 300. The timing enforcer 504 may ensure that the messages are provided to the component in order of ascending generation time. In an additional or alternate example, the timing enforcer 504 may provide the messages to the component 300 in an order that corresponds to a sequence of events from the log file. In some examples, the timing enforcer 504 may additionally or alternatively cause the execution of the component 300 and/or publication of a message to occur according to the sequence of events 620.

In some examples, the timing enforcer 504 may determine one or more message(s) 510 referenced by a sequence of events of the log file 502 and may retrieve the message(s) 510 from a data store and provide the message(s) 510 to the component 300 according to the sequence of events. For example, timing enforcer 504 may determine that an identifier of a reproducibility message stored in the log file 502 corresponds to a next execution of the component 300 (e.g., the next execution of the component 300 will be the 200$^{th}$ execution and the timing enforcer 504 determines that the log file 502 comprises a reproducibility message associated with the 200$^{th}$ execution) and that the reproducibility message identifies the message(s) 510 and an order thereof. Depending on the use case, the reproducing controller 500 may wait to receive message(s) 510 from upstream controller(s) (since the framework is deterministic, the upstream controller(s) will publish messages having the same identifiers as the message(s) 510) and/or the reproducing controller 500 may read the message(s) 510 from a memory (e.g., the data store 356). The timing enforcer 504 may determine an order in which to provide the message(s) 510 as input. Moreover, where the message(s) 510 comprises a message published by the online controller 320, if the component 300 has been modified, as discussed below, the message previously published by the online controller 320 (and included in the message(s) 510) may be retrieved and compared to a product of the component 300 for a same execution of the component 300 (e.g., the 200$^{th}$ execution in the example above).

In some examples, the timing enforcer 504 may additionally or alternatively cause other data from the log file 502 (and/or the data store 356) to be provided to the component 300 in an order specified by the sequence of events. For example, this may comprise providing sensor data, non-deterministic values, a clock signal, a product of a component, etc., as input to the component 300. This may allow framework comprising the reproducing controller 500 to deterministically reproduce a scenario that occurred during operation of a system that includes the component 300.

In some instances, the sequence of events may be defined by a user instead of or in addition to a recorded sequence. Moreover, data contained in the log file 502 may be provided from an online controller, a user that defines the data, and/or a simulation component. For example, a simulation component may be configured to simulate sensor data and/or an autonomous vehicle response to an output of the system including the component 300. For example, a simulation component may form part of a feedback loop for the system comprising the component 300. The simulation component itself may be associated with a controller.

Figure 6:
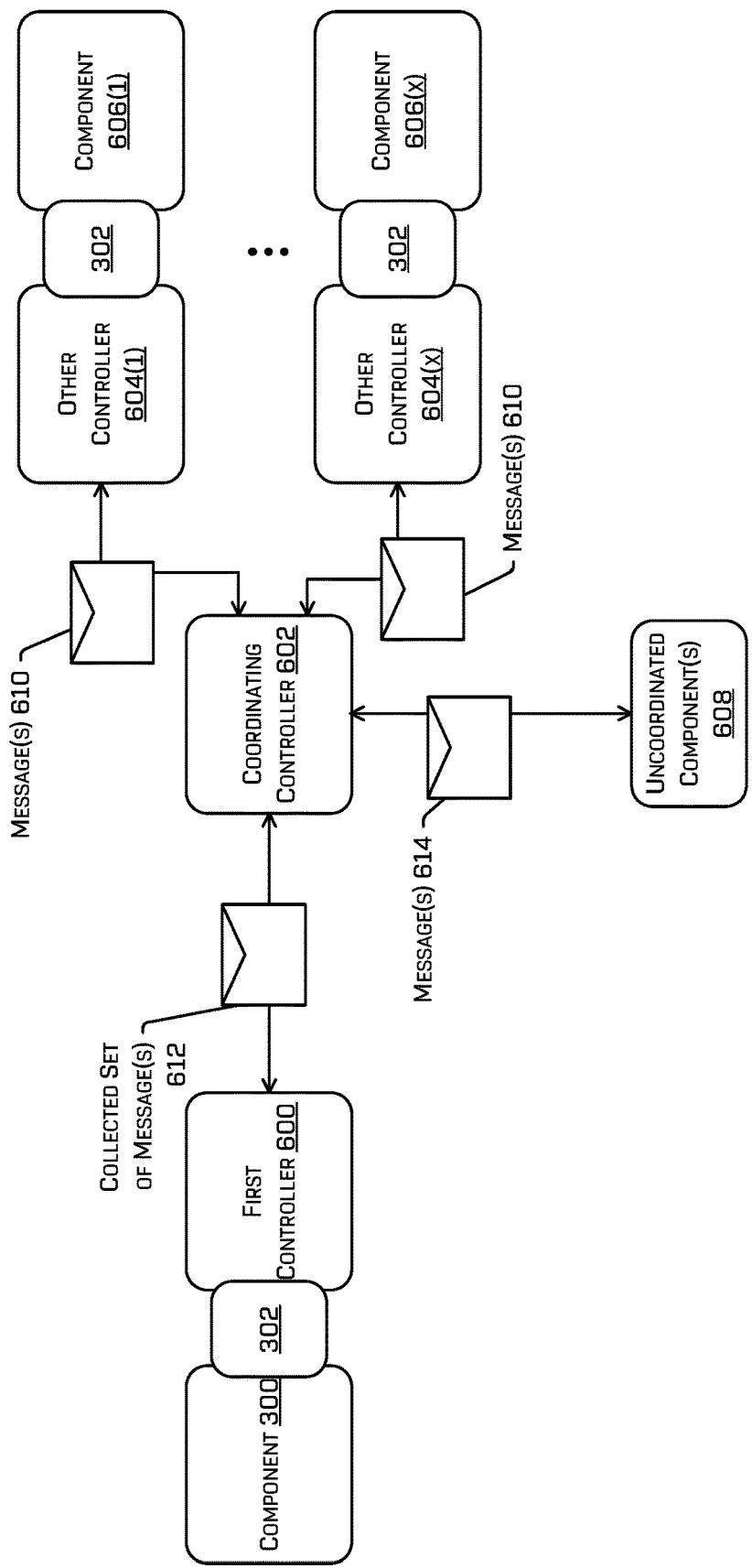
FIG. 6 illustrates a block diagram of a framework implementation comprising a component, I/O interface, a coordinating controller, other controllers and components associated therewith, and uncoordinated component(s).

FIG. 6 illustrates a block diagram of a framework implementation comprising a component 300, I/O interface 302, a first controller 600, a coordinating controller 602, other controller(s) 604(1)-(x) and components 606(1)-(x) associated therewith, and uncoordinated component(s) 608.

In some examples, coordinating controller 602 may coordinate actions between multiple controllers instead of being associated with a specific component. For example, the coordinating controller 602 may receive message(s) 610 from the other controller(s) 604(1)-(x) and may ensure that the message(s) 610 are routed to the appropriate subscriber(s). In some examples, at an instantiation of framework, the coordinating controller 602 may request a parameter set from the controllers (e.g., any of first controller 600 and/or other controller(s) 604(1)-(x)). The first controller 600 may generate the parameter set based at least in part on querying the component 300 to ascertain the input, execution, and/or output characteristics of the component 300. The first controller 600 may retain at least part of the input, execution, and/or output characteristics and may transmit, to the coordinating controller 602, a parameter set specify input(s) the component 300 uses to execute (e.g., other component(s) to which the component subscribes, message(s) the component 300 consumes, non-deterministic variable(s) the component 300 consumes), output(s) the component generates (e.g., a type of message, subscriber(s) to which the component 300 outputs messages), etc. For example, the input(s) the component 300 uses to execute may include an identifier of a set of messages and/or non-deterministic variables that the component 300 consumes to generate an output. The parameter set may further comprise delay times associated with the component 300 such as, for example, an initialization delay, an average execution time (at a given processing frequency), etc.

The parameter sets received from the controllers may be sufficient to configure the coordinating controller 602 to route messages between the controllers according to a pipeline configuration. However, to further make the components agnostic to the processing pipeline flow, the coordinating controller 602 may receive a configuration that specifies a data processing pipeline configuration. For example, the configuration may identify a pub-sub pattern defining the relative position of components/controllers to each other in the flow (e.g., the component(s) to which component 300 subscribes, the component(s) to which component 300 publishes).

Based at least in part on the parameter set and/or the configuration, a coordinating controller 602 may route message(s) 610 received from other controller(s) 604(1)-(x) to the appropriate subscribing controller(s). In some instances, the parameter set associated with component 300 may configure the coordinating controller 602 to collect message(s) identified as corresponding to a set of messages consumable by the component 300 as input for execution. The coordinating controller 602 may collect the message(s) until the coordinating controller 602 determines that the collected messages fulfill the set of messages at which time the coordinating controller 602 may transmit the collected set of message(s) 612 to the first controller 600 associated with component 300. In some examples, the coordinating controller 602 may additionally or alternatively delay and/or otherwise time publication of message(s) to the first controller 600 based at least in part on generation time(s) associated with the message(s), horizon time(s) associated with the message(s), and/or a sequence of events stored in a log file and/or provided by a user. For example, the coordinating controller 602 may comprise a timing enforcer 504 that accomplishes substantially the same operations as discussed above, except that the coordinating controller 602 would not interact with an I/O interface 302 directly, but may rather transmit instructions and/or messages to the first controller 600, which may, in turn, provide messages and/or instructions to the component 300 via the I/O interface 302.

In some examples, the coordinating controller 602 may additionally or alternatively, exchange message(s) 614 with uncoordinated component(s) 608. The uncoordinated component(s) 608 may be deterministic component(s), may not include the I/O interface 302, and/or may not be associated with a controller other than the coordinating controller 602. In some examples, messages sent over the pub-sub network between the controllers may differ in format from messages sent between uncoordinated component(s) 608. Moreover, the uncoordinated component(s) 608 may exchange messages over a different channel and/or topic of the pub-sub network than coordinated components (e.g., component 300 and/or component(s) 606(1)-(x) in this example).

In some examples, the coordinating controller 602 may receive a message from a controller, determine that the message should be routed to an uncoordinated component (even if the message is formatted for a coordinated component), convert the message to an uncoordinated message type, and/or publish the converted message 614 to the uncoordinated component (e.g., via an uncoordinated component portion of a pub-sub architecture). In some examples, converting the message may comprise publishing the converted message over a second network channel and/or second topic when the original message was received over a first network channel and/or first topic and/or removing information pertinent to a coordinated component (e.g., removing a horizon time, removing instructions to interact with an I/O interface, removing references to the I/O interface). The coordinating controller 602 may inversely implement this process for message(s) received from the uncoordinated component(s) 608 (e.g., the coordinating controller 602 may associate a reception time with a message received from the uncoordinated component(s), the coordinating controller 602 may publish the message over a coordinated portion of the pub-sub architecture). In some examples, since the uncoordinated component(s) 608 are not associated with a controller, the coordinating controller 602 may determine a time at which to provide message(s) to the uncoordinated component(s) so that time-safety and/or message-safety is not violated at the uncoordinated component(s) 608.

In some examples, the coordinating controller 602 may conduct a discovery operation to discover a mapping of the pipeline configuration by publishing parameter sets received from controller(s) associated with the coordinating controller 602 and receiving parameter sets from other coordinating controllers until parameter sets have been received from all other coordinating controllers.

Example Process

Figure 7:
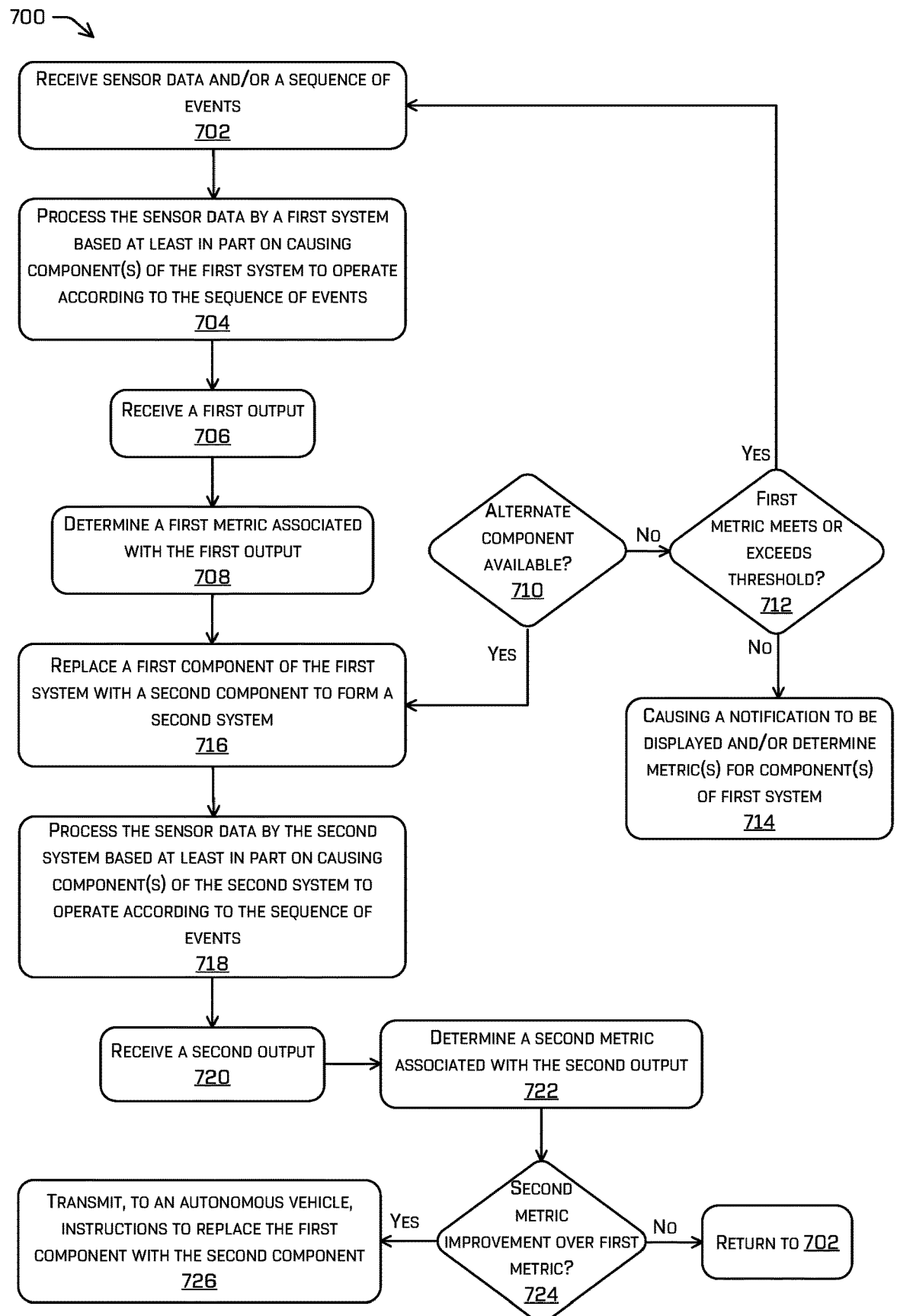
FIG. 7 illustrates a flow diagram of an example process for tuning performance of a system using the framework discussed herein.

FIG. 7 illustrates a flow diagram of an example process 700 for tuning performance of a system using the framework discussed herein. The system may be a first system that comprises a first component and/or other component(s) such as, for example, processor-executable instructions, a machine-learned model, and/or hardware. In some instances, a tuning model, a coordinating controller, I/O interface, and/or any of the types of controller(s) discussed herein may conduct all or part of example process 700.

At operation 702, example process 700 may comprise receiving sensor data and/or a sequence of events, according to any of the techniques discussed herein. For example, the sensor data and/or sequence of events may be stored in a log file. In some examples, an online controller may store the sensor data and/or sequence of events based at least in part on monitoring operations of a component during online operation of the component. It is contemplated that the log file may be generated by one or more online controller(s) and/or components associated therewith. In an additional or alternate example, the sensor data may comprise simulated sensor data generated by a component operated by the framework. In other words, one of the components of the framework may be a simulator that generates data that is used as input for other components of the framework. In some examples, at least one component may be a source (e.g., the component generates an output and does not consume an input) and/or at least one component may be a sink (e.g., the component receives an input but does not generate an output).

At operation 704, example process 700 may comprise processing the sensor data by a first system based at least in part on causing component(s) of the first system to operate according to the sequence of events, according to any of the techniques discussed herein. For example, the component(s) of the first system may be associated with a reproducing controller (or any of the other types of controllers) that enforces the rules discussed above (e.g., via the timing enforcer, the message data such as the generation time, horizon time, etc.) to accomplish a deterministic reproduction of the behavior of the first system when the first system processed the sensor data at the time the sensor data and/or sequence of events was saved. In some examples, in order for operation 704 to be accomplished, the framework discussed herein may first be instantiated by associated controller(s) with those of the component(s) that include the I/O interface and/or a coordinating controller with uncoordinated component(s) the first system. In some examples, the instantiation may occur before operation 704 and may further comprise receiving parameter set(s) and/or a configuration, as discussed above.

Causing the first component and the other component(s) to operate according to the sequence of events may comprise controlling input to, output from, and/or execution states of the component(s) of the first system such that execution of the component(s) generates a deterministic output. This means the framework discussed herein would cause the first system to generate a same output every time the same sensor data and/or the same sequence of events is provided to the first system coordinated by the framework.

At operation 706, example process 700 may comprise receiving, based at least in part on processing the sensor data by the first system, a first output, according to any of the techniques discussed herein. For example, the first output may be an output of the system as whole, which may be the output(s) of component(s) of a last layer of the first system (i.e., a layer of components that is furthest downstream and last to generate outputs in the flow of the data processing pipeline). In another example, the first output may be an output of a particular component, depending on the target of the tuning procedure. In some examples, the first output may be an output of the system since, in some instances, improving performance of a particular component may actually harm performance of the overall system. For example, even though a particular component might operate better, it may operate longer and/or create an output that, for reasons obscured by the complexity of the pipeline (e.g., a neural network and/or other machine-learning model may comprise hidden layer(s) and/or activation function(s) that may be stimulated by an altered input thereto, causing a variance in an output), cause the system to be less accurate and/or precise. As a non-limiting example, a new detection component may have a better detection rate for pedestrians than a previous version, but a worse detection rate for objects overall.

At operation 708, example process 700 may comprise determining a first metric associated with the first output, according to any of the techniques discussed herein. For example, the metric may comprise an accuracy, a precision, a PR curve, a ROC curve, a latency, reaction time (e.g., a number of executions before identifying an object and/or track), and/or an acceleration (e.g., whether a lateral acceleration meets or exceeds a lateral acceleration threshold, whether a forward acceleration meets or exceeds a forward acceleration threshold associated with a perceived "jerk" of the vehicle), etc. associated with the first output. These metrics may be suitable for quantifying performance of a variety of components for which a ground truth may be known, but it is contemplated that additional or alternate metrics may be suitable for quantifying performance of the system based on the output and/or any inputs, ground truth, etc.

At operation 710, example process 700 may comprise determining whether an alternate component is available, according to any of the techniques discussed herein. For example, as component(s) are modified, e.g., by developer updates to source code, hardware modifications, and/or by additional machine-learning training techniques, modified component(s) may be stored in a repository. The modified component(s) may be stored in association with versioning and/or other identifier data so that, at operation 710, the example process 700 may determine whether a modified version of a component is stored in the repository.

In some examples, if no alternate component(s) are available, example process may transition to operation 712. At operation 712, example process 700 may comprise determining whether the first metric meets or exceeds a threshold metric. Meeting or exceeding the threshold metric may be indicative of suitable performance of the first system. If operation 712 determines that the first metric meets or exceeds the threshold metric, example process 700 may return to operation 702, which may include receiving new sensor data and/or a new sequence of events.

However, if the threshold does not meet the threshold metric and no alternate component is available, example process may transition to operation 714. At operation 714, example process 700 may comprise causing a notification to be displayed via user interface to notify a user that the first system does not meet the threshold metric. Additionally or alternatively, operation 714 may comprise determining metric(s) associated with particular component(s) of the first system when the first metric was associated with an output of the system and/or determining whether the metric(s) meet or exceed the threshold metric.

Returning to operation 710, operation 710 may determine that an alternate component is available. For example, this determination may include determining that a modified version of a component is available in repository and/or determining that an indication has been received from a user interface indicating an alteration to the configuration of the pipeline. In an additional or alternate example, a user may directly supply an alternate component (e.g., by storing the component in a memory accessible to a computing device performing the example process 700 and providing a pointer to an address associated with the component, by physically changing out hardware, by flashing a memory of an ASIC and/or FPGA). Based at least in part on determining that an alternate component is available, example process 700 may transition to operation 712.

At operation 716, example process 700 may comprise replacing a first component of the first system with a second component to form a second system, according to any of the techniques discussed herein. The second system may therefore comprise the second component and the other component(s) of the first system. In some examples, operation 716 may replace one component at a time in order to maintain an experimental control, although other replacement strategies are contemplated. For example, if the second component requires an input from an additional component that doesn't exist in the first system, replacing the first component with the second component may comprise exchanging the first component for the second component and adding the additional component to the system and/or replacing another component of the first system with the additional component. It is contemplated that more than one component may be changed at a time.

In some examples, operation 716 may additionally or alternatively comprise seeking user authorization of the replacement before replacing the first component with the second component. In another example, operation 716 may comprise automatically causing the replacement and subsequent operations without user input based at least in part on determining that an alternate component is available at operation 710. For example, example process 700 may be entirely automated. For example, an autonomous vehicle may periodically record sensor data and/or a sequence of events and, check a remote repository, and/or transmit the sensor data and/or sequence of events to a remote device that includes the repository. The remote device may then automatically conduct example process 700.

At operation 718, example process 700 may comprise re-processing the sensor data by the second system based at least in part on causing component(s) of the second system to operate according to the sequence of events, according to any of the techniques discussed herein. The controller(s), 110 interface, and/or coordinating controller(s) of the framework may operate as they did in operation 704, but one of the controller(s) will be controlling the second component instead of the first component. In some examples, the controller may be agnostic to this change and may not need any additional data.

At operation 720, example process 700 may comprise receiving, based at least in part on processing the sensor data by the second system, a second output, according to any of the techniques discussed herein. Since the framework enables both the first system and the second system to operate deterministically, by replacing the first component with the second component, any differences between the first output and the second output may be attributable to the replacement. This enables the system's performance to be tuned in a manner that is not otherwise possible without the framework.

In some examples, the first output and the second output may be associated with a same identifier (e.g., a same generation time, as defined above, associated with a message the comprises the respective outputs) since the framework forces the system to operate deterministically. In some instances, a tuning model may receive a first message from a reproducing controller (e.g., during reproduction of behavior of a system and/or component captured during an online controller's operation) and identify, from the data store, a second message recorded during the online controller's operation that has a same generation time (or other identifier) as the first message. The tuning model may then compare a first output of the first message and a second output of the second message and/or may determine one or more metrics associated with the first message and the second message, as discussed further below.

At operation 722, example process 700 may comprise determining a second metric associated with the second output, according to any of the techniques discussed herein.

At operation 724, example process 700 may determine whether the second metric is an improvement over the first metric, according to any of the techniques discussed herein. If the second metric is not an improvement over the first metric, the example process 700 may return to operation 702. Additionally or alternately, the example process 700 may store, in association with the second component, an indication that the second metric was not an improvement over the first metric and/or the threshold metric. If the second metric is an improvement over the first metric (and/or the threshold metric), example process 700 may transition to operation 726. The second metric may be an improvement over the first metric where the second metric indicates an accuracy and/or precision that meets or exceeds an accuracy and/or precision indicated by the first metric; the second metric indicates a PR curve, ROC curve, and/or acceleration that conforms more closely to an curve than a PR curve, ROC curve, and/or acceleration indicated by the first metric; and/or the second metric indicates a latency and/or reaction time that is less than a latency and/or reaction time indicated by the first metric. It is understood that the metric may include other indications of performance of a system and/or component and that an improvement of one metric value over another will therefore change depending on the metric type (e.g., sometimes an improvement will be indicated by a greater value, sometimes a lesser value, sometimes grater conformance to a standard and/or threshold). In some examples where a metric indicates more than one type of metric, the various metrics may be weighted and a weighted sum of differences may be calculated to determine whether the second metric is an improvement over the first metric.

At operation 726, example process 700 may comprise transmitting, to an autonomous vehicle, instructions to replace the first component with the second component, according to any of the techniques discussed herein.

Example Architecture

Figure 8:
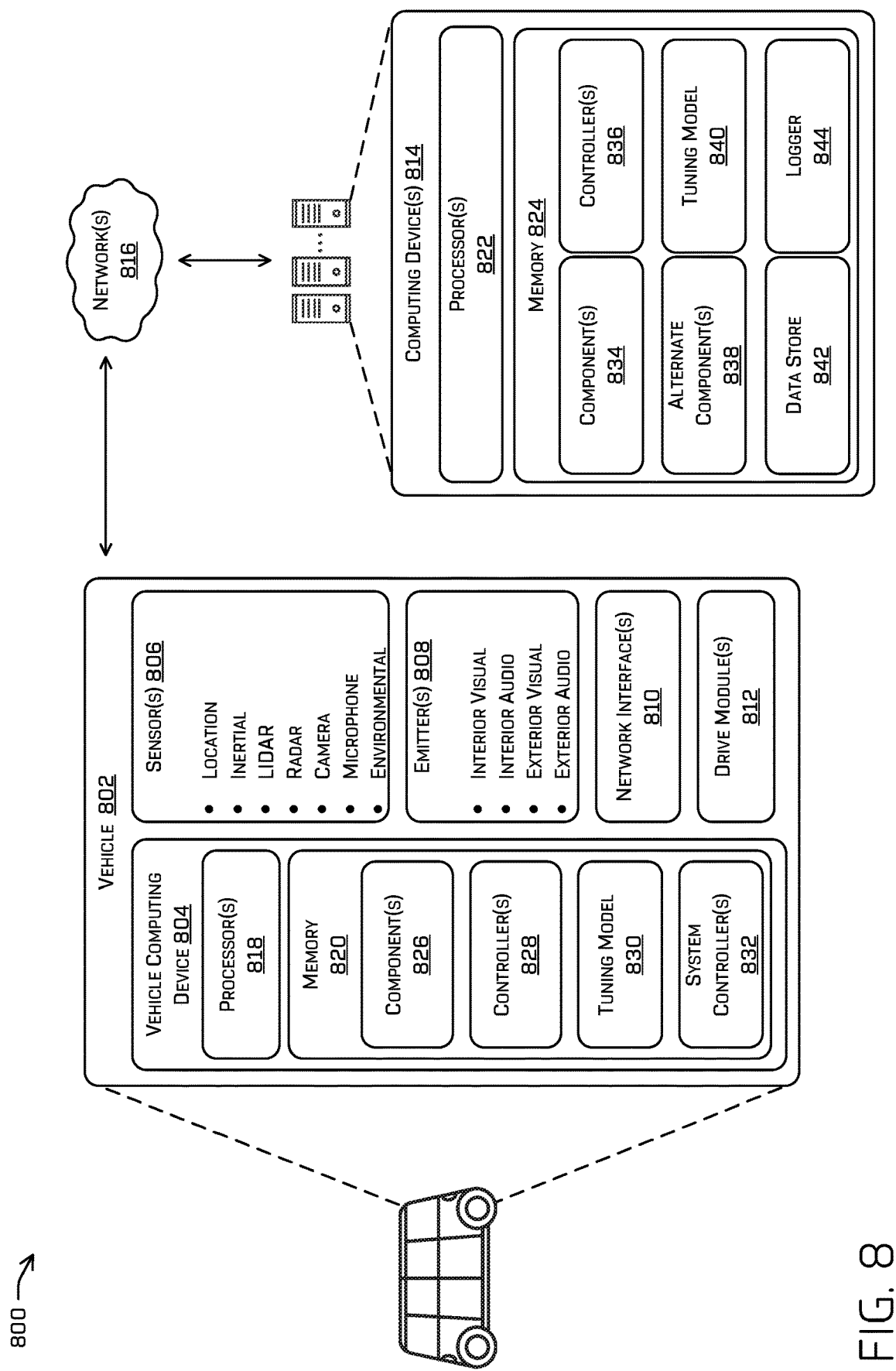
FIG. 8 illustrates a block diagram of an example architecture that implements the framework discussed herein.

FIG. 8 illustrates a block diagram of an example architecture that implements the framework discussed herein. In some instances, the system 800 may include a vehicle 802, which may correspond to the autonomous vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well. The vehicle 802 may include a vehicle computing device 804, one or more sensor(s) 806, one or more emitters 808, one or more network interfaces 810, at least one and/or one or more drive modules 812.

In some instances, the sensor(s) 806 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 806 may include multiple instances of each of these or other types of sensors. For instance, the LIDAR sensors may include individual LIDAR sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device 804.

The vehicle 802 may also include emitter(s) 808 for emitting light and/or sound, as described above. The emitter(s) 808 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). For instance, the network interface(s) 810 may facilitate communication with other local computing device(s) on the vehicle 802 and/or the drive module(s) 812. Also, the network interface (s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with a computing device 814.

The network interface(s) 810 may include physical and/or logical interfaces for connecting the vehicle computing device 804 to another computing device or a network, such as network(s) 816. For example, the network interface(s) 810 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 804 and/or the sensor(s) 806 may send sensor data, via the network(s) 816, to the computing device(s) 814 at a particular frequency, after a lapse of a predetermined period of time, in near real-time, etc.

In some instances, the vehicle 802 may include one or more drive modules 812. In some instances, the vehicle 802 may have a single drive module 812. In some instances, the drive module(s) 812 may include one or more sensors to detect conditions of the drive module(s) 812 and/or the surroundings of the vehicle 802. By way of example and not limitation, the sensor(s) of the drive module(s) 812 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive module(s) 812. In some cases, the sensor(s) on the drive module(s) 812 may overlap or supplement corresponding systems of the vehicle 802 (e.g., sensor(s) 806).

The drive module(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 812 may include a drive module controller which may receive and preprocess data from the sensor(s) and to control operation of the various vehicle systems. In some instances, the drive module controller may include one or more processors and memory communicatively coupled with the one or more processors. The memory may store one or more modules to perform various functionalities of the drive module(s) 812. Furthermore, the drive module(s) 812 may also include one or more communication connection(s) that enable communication by the respective drive module with one or more other local or remote computing device(s).

The vehicle computing device 804 may include one or more processors 818 and memory 820 communicatively coupled with the one or more processors 818. Computing device(s) 814 may also include processor(s) 822, and/or memory 824. The processor(s) 818 and/or 822 may be any suitable processor capable of executing instructions to process data and perform operations as described herein. By way of example and not limitation, the processor(s) 818 and/or 822 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 820 and/or 824 may be examples of non-transitory computer-readable media. The memory 820 and/or 824 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 820 and/or memory 824 may store component(s) 826 and/or 834 such as, for example, component(s) of a primary perception system, a secondary perception system, a prediction system, a localization system, a mapping system, a planning system, a ride management system, etc. These (and other) system(s) may comprise a variety of components that make up a data processing pipeline(s). Although component(s) 826 and/or 834 are illustrated as being stored in memory 820 and/or 824, component(s) 826 and/or 834 may include processor-executable instructions, machine-learned model(s) (e.g., a neural network), and/or hardware. In some examples, component(s) 826 and/or 834 that are to be coordinated according to the framework discussed herein may be configured to include the I/O interface 302.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

Memory 820 and/or 824 may additionally or alternatively store controller(s) 828 and/or 836, which may comprise any of the controller(s) discussed herein. For example, controller(s) 828 and/or 836 may comprise online controller(s), reproducing controller(s), and/or coordinating controller(s). In some examples, memory 820 and/or 824 may additionally or alternatively store a tuning model 830 and/or 840 that may be configured to conduct at least part of example process 700. For example, tuning model 830 may periodically query computing device(s) 814 to determine whether any alternate component(s) 838 are available. Alternate component(s) 838 may comprise a modified version of a component 826, a new component, an alteration to a pipeline configuration, etc. If an alternate component is available, the tuning model 830 may cause an online controller to generate a log file for a current configuration of a system on the vehicle that includes a component that corresponds to the alternate component. Once the log file has been generated, the tuning model 830 may transmit the log file to the computing device(s) 814 for a tuning model 840 stored in memory 824 to execute example process 700 and/or the tuning model 830 may conduct example process 700 on-vehicle. In another example, the tuning model 830 may periodically cause a log file to be saved and transmitted to the computing device(s) 814, regardless of the availability of an alternate component. The computing device(s) may, in turn, use the periodically received log files to test differences between performance of a current configuration of a system on the vehicle versus performance of a second system that incorporates an alternate component.

Memory 820 may additionally or alternatively store one or more system controller(s) 832, which may be configured to control steering, propulsion, braking, safety, emitters, communication, and other systems of the vehicle 802. These system controller(s) 832 may communicate with and/or control corresponding systems of the drive module(s) 812 and/or other components of the vehicle 802.

In some instances, computing device(s) 814 may comprise a data store 842 and/or a logger 844. In some instances, the data store 842 may be configured to store messages published over a data channel (e.g., messages published between controllers for consumption by component(s)) and the logger 844 may store messages published over a reproducibility channel. In some instances, the logger 844 may additionally or alternatively generate a log file, as described herein, based at least in part on reproducibility messages received thereby.

In some instances, the component(s) 826 may process sensor data, and the controller(s) 828 associated therewith may send the respective outputs, over the one or more network(s) 816, to one or more computing device(s) 814 (e.g., at a particular frequency, after a lapse of a predetermined period of time, in near real-time, etc.)

In some examples, computing device(s) 814 may comprise one or more nodes of a distributed computing system (e.g., a cloud computing architecture). The framework comprising the controller(s) 836 associated with the component(s) 834 may allow the component(s) 834 to be executed on disparate computing devices while maintaining deterministic operation and reproducibility of the component(s) 834.

It should be noted that while FIG. 8 is illustrated as a distributed system, in alternative examples, components of the vehicle 802 may be associated with the computing device(s) 814 and/or components of the computing device(s) 814 may be associated with the vehicle 802. That is, the vehicle 802 may perform one or more of the functions associated with the computing device(s) 814, and vice versa.

Example Clauses

A. A method comprising: receiving sensor data from a sensor on an autonomous vehicle; processing the sensor data by a first system, wherein the first system comprises a first component and one or more other components and wherein the processing is based at least in part on controlling operation of the first component and the one or more other components; recording a sequence of events based at least in part on receiving one or more messages from a first controller associated with the first component during the processing the sensor data by the first system; receiving, based at least in part on processing the sensor data by the first system, a first output; replacing the first component with a second component to obtain a second system comprising the second component and the one or more other components; processing the sensor data by the second system based at least in part on causing the second component to operate according to the sequence; receiving, based at least in part on processing the sensor data by the second system, a second output; and transmitting, to the autonomous vehicle, instructions to replace the first component with the second component based at least in part on determining a difference between the first output and the second output.

B. The method of paragraph A, wherein: the events comprise at least one of providing input to the first component, causing the first component to execute, or receiving an output from the first component; and causing the second component to operate according to the sequence comprises at least one of providing the input, transmitting the output, or executing as specified by the sequence.

C. The method of paragraph A or B, further comprising: determining at least one of a first metric associated with the first output and a second metric associated with the second output; and wherein determining the difference comprises determining that at least one of the second metric is an improvement over the first metric.

D. The method of any ones of paragraphs A-C, wherein processing the sensor data by the first system comprises: receiving, at the first controller associated with the first component, upstream messages from one or more upstream controllers associated with one or more upstream components, the messages comprising horizon times, a horizon time identifying a duration until a component executes again; determining, by the first controller and based at least in part on the sequence, an order of the upstream messages; determining, by the first controller and based at least in part on the horizon times, a period of time; providing, by the first controller and during the period, the upstream messages as input to the component according to the order; causing, by the first controller, the first component to execute one or more times until the period expires; receiving, at the first controller and from the first component responsive to execution of the first component, an output; and publishing, by the first controller and to one or more subscribing controllers, an output message comprising the output, a generation time identifying a discrete execution of the first component that resulted in the output, and a horizon time.

E. The method of any ones of paragraphs A-D, wherein one of the one or more subscribing controllers comprises a simulation controller associated with a simulation component that simulates a response of an autonomous vehicle to the output message.

F. The method of paragraph A, further comprising: receiving, from the first controller, a keyframe identifying an internal state of the first component based at least in part on a discrete execution of the first component; and wherein processing the sensor data by the second system comprises: skipping to an execution of the second component that matches the execution identified in the keyframe; and setting an internal state of the second component to match the internal state identified by the keyframe.

G. A system comprising: one or more processors; memory storing: a first component; and a first controller associated with the first component and wherein the first controller, when executed by the one or more processors, cause the system to perform operations comprising: receiving a sequence of events at the first component relative to operations of one or more other components; receiving a first message from an upstream controller to which the first controller subscribes, wherein the message comprises a first output of an execution of a second component; determining, based at least in part on the sequence, an order of one or more messages, the one or more messages comprising the first message; providing, as input to the first component, the one or more messages according to the order; determining, based at least in part on the sequence, a time at which to cause the first component to execute; causing, at the time and based at least in part on receiving the one or more messages at the first component, the first component to execute; receiving an output of the first component in response to the first component executing; and publishing, to one or more subscribing controllers, a message comprising the output.

H. The system of paragraph G, wherein: the first message comprises a first horizon time; at least one of the one or more messages comprises a second horizon time; and the operations further comprise determining, based at least in part on the first horizon time and the second horizon time, a period of time to allow the first component to execute, wherein the period is the lesser of the first horizon time or the second horizon time; and the first component executes during the period.

I. The system of paragraph G or H, wherein: a first system comprises the first component and the one or more other components; and the memory further comprises instructions that, when executed by the one or more processors, cause the system to: replace the first component with a third component to obtain a second system comprising the third component and the one or more other components; cause the second system to repeat the operations using the third component, including: receive a second output of the third component during the period in response to the third component executing; and publish, to one or more subscribing controllers, a second message comprising the second output.

J. The system of any ones of paragraphs G-I, wherein the first system determines a first product based at least in part on the first message; the second system determines a second product based at least in part on the second message; and the memory further comprises instructions that, when executed by the one or more processors, cause the processors to: determine, based at least in part on the first product, a first metric; determine, based at least in part on the second product, a second metric; and transmit, to an autonomous vehicle, instructions to replace the first component with the third component based at least in part on determining that the second metric is an improvement over the first metric.

K. The system of any ones of paragraphs G-J, wherein one controller of the one or more subscribing controllers is associated with a simulation component that simulates a response of an autonomous vehicle to one or more messages received at the simulation component from one or more controllers associated with one or more components.

L. The system of any ones of paragraphs G-K, wherein the operations further comprise preventing the first component from executing upon at least one of expiration of a time period or determining that the sequence indicates that at least one other component must execute before the first component executes.

M. A non-transitory computer-readable medium having processor-executable instructions stored thereon that, when executed by one or more processors, cause the one or more processors to: receive log data comprising sensor data and a sequence of events; cause at least two components to execute with respect to each other according to the sequence, the two components associated with two controllers that cause the at least two components to execute; receive, based at least in part on causing the at least two components to execute, a first output of a first system that comprises the at least two components; replace one of the at least two components with a replacement component to form a second system; cause the components of the second system to execute according to the sequence; receive, based at least in part on causing the components of the second system to execute, a second output of the second system; and transmit, to an autonomous vehicle, an instruction to use the replacement component based at least in part on determining a difference between the first output and the second output.

N. The non-transitory computer-readable medium of paragraph M, wherein causing the at least two components to execute according to the sequence comprises at least one of: determining an order of providing input to a component, providing output from the component to another component of the at least two components, or causing the component to execute relative to at least one of providing input to the another component, providing output from the another component to at least one of the component or an additional component, or causing the another component to execute.

O. The non-transitory computer-readable medium of paragraph M or N, wherein: determining the difference comprises: determining a first metric of the first output and a second metric of the second output; and determining that the second metric is an improvement over the first metric.

P. The non-transitory computer-readable medium of any ones of paragraphs M-O, wherein the instructions, when executed by the one or more processors, further cause the one or more processors to: receive, based at least in part on causing a first component of the at least two components to execute, a keyframe serializing an internal state of the first component during execution; set, at a time subsequent to receiving the keyframe, the internal state of the first component to match the internal state of the keyframe; and cause the first component to reproduce the execution based at least in part on the internal state.

Q. The non-transitory computer-readable medium of any ones of paragraphs M-P, wherein: the instructions, when executed by the one or more processors, further cause the processors to store at least one of a non-deterministic variable or clock data provided as input to one of the at least two components during execution of the at least two components, and causing the components of the second system to execute comprises: retrieving the at least one of the non-deterministic variable or the clock data, and providing the at least one of the non-deterministic variable or the clock data to at least one of the components of the second system during execution of the at least one of the components.

R. The non-transitory computer-readable medium of any ones of paragraphs M-Q, wherein: the at least two components comprise a first component and a second component; a first controller is associated with the first component; a second controller is associated with the second component; causing the first component to execute according to the sequence further comprises: receiving, at the first controller, a first message from the second controller, the first message comprising output of the second component and a first horizon time; determining that the first horizon time is less than another horizon time of another message; and determining to cause the first component to execute prior to expiration of the first horizon time.

S. The non-transitory computer-readable medium of any ones of paragraphs M-R, wherein the instructions, when executed by the one or more processors, further cause the one or more processors to: receive an output from the second component responsive to the second component executing; generate a second message comprising a time that the output was received from the second component and a second horizon time indicating a duration of time; and publish, to one or more subscribing controllers, the second message.

T. The non-transitory computer-readable medium of any ones of paragraphs M-S, wherein: the at least two components comprise a second component and a third component; a first controller is associated with the second component; a second controller is associated with the third component; the second component generates an output usable by a computing device to control operation of the autonomous vehicle; the first controller transmits a message comprising the output to the second controller; the second controller receives the message and provides the output as input to the third component; and the third component comprises a simulation component that emulates a response of the autonomous vehicle and outputs simulated data.

U. A non-transitory computer-readable medium storing: a first software component comprising: an input interface configured to receive, from a controller, an indication to execute the first software component and one or more variables; first instructions that, when executed by one or more processors, cause the one or more processors to: execute the first software component based at least in part on the one or more variables and responsive to receiving the indication; receive a product of the execution of the first software component; and an output interface configured to output the product to the controller; and the controller comprising second instructions that, when executed by the one or more processors, cause the one or more processors to perform operations comprising: control values of the one or more variables provided to the input interface, the product of the execution being based at least in part on the values; control a time at which the first software component executes based at least in part on transmitting the indication to the input interface; and receive the product from the output interface.

V. The non-transitory computer-readable medium of paragraph U, further comprising third instructions that, when executed by the one or more processors, cause the one or more processors to: exchange the first software component for a second software component, wherein the second software component comprises the input interface and the output interface.

W. The non-transitory computer-readable medium of paragraph U or V, wherein the second instructions, when executed by the one or more processors, further cause the one or more processors: provide, as input via the input interface, at least one of a clock signal, sensor data received from a sensor of the autonomous vehicle, or non-deterministic values usable by the first software component to execute.

X. The non-transitory computer-readable medium of any ones of paragraphs U-W, wherein the second instructions, when executed by the one or more processors or one or more second processors, further cause the one or more processors to: receive, from an upstream controller associated with a third software component, a second message that comprises a second product of the third software component; and provide, as input via the input interface, the second product as one of the one or more variables.

Y. The non-transitory computer-readable medium of any ones of paragraphs U-X, wherein the first instructions, when executed by the one or more processors, further cause the one or more processors to: serialize, as a keyframe, an internal state of the first software component; and wherein the output interface is configured to output the keyframe to the controller.

Z. The non-transitory computer-readable medium of any ones of paragraphs U-Y, wherein the first instructions, when executed by the one or more processors, further cause the one or more processors to serialize the internal state at least one of periodically or based at least in part on determining that a degree of change of the internal state meets or exceeds a threshold degree of change.

AA. The non-transitory computer-readable medium of any ones of paragraphs U-Z, wherein the first instructions, when executed by the one or more processors, further cause the one or more processors to: skip to a discrete execution of the first software component specified by the keyframe at a time subsequent to serializing the keyframe; deserialize the keyframe to set the internal state of the first software component to match the internal state serialized by the keyframe; and cause the first software component to execute, starting from the discrete execution.

AB. A system comprising: one or more processors; memory storing: a first component comprising: instructions executable by a computing device, the instructions generating a product used, at least in part, by the computing device to control operation of at least one of a machine control apparatus or a data processing pipeline; and an interface that comprises: a first input interface configured to receive one or more variables; a second input interface that receives an indication to execute the instructions; and a first output interface that outputs the product, based at least in part on the one or more variables and receiving the indication; and a first controller associated with the first component and comprising first instructions that, when executed by the one or more processors, cause the one or more processors to: control, via the first input interface, an order in which the one or more variables are provided to the first input interface; control, via the second input interface, when the indication is sent to the second input interface, causing the first component to execute; receive, via the first output interface, the product; publish, to one or more downstream controllers, a message that comprises the product and a time at which the product was received at the first controller.

AC. The system of paragraph AB, wherein: the first controller is an online controller; the first instructions, when executed by the one or more processors, further cause the one or more processors to: store, in a log file, an order of events at the interface relative to one or more events at another component, the events comprising at least one of: providing the one or more variables to the first input interface, causing the first component to execute via the second input interface, or receiving an output from the first component via the first output interface.

AD. The system of paragraph AB or AC, wherein the first instructions, when executed by the one or more processors, further cause the one or more processors to store, in the log file, at least one of sensor data received from a sensor on an autonomous vehicle, non-deterministic data consumed by the first component, or diagnostic information regarding execution of the first component.

AE. The system of any ones of paragraphs AB-AD, wherein: the first controller is a reproducing controller; the first instructions, when executed by the one or more processors, further cause the one or more processors to: receive a log file that comprises a sequence of events at one or more components, the sequence of events defining an order in which the events occurred as the one or more components were executed previously; prevent the first component from at least one of receiving the one or more variables or executing based at least in part on determining that providing the one or more variables or causing the first component to execute would disrupt the sequence; and at least one of provide the one or more variables, cause the first component to execute, or publish the message based at least in part on the sequence.

AF. The system of ones of paragraphs AB-AE, wherein the interface further comprises: a second output interface that serializes a first internal state of the first component as a first keyframe and outputs the first keyframe, wherein the first internal state comprises at least one of a non-deterministic variable value, a counter value, output context, or an internal variable value that is based at least in part on a previous execution of the first component; and a third input interface that receives a second keyframe, deserializes the second keyframe into a second internal state, and causes an internal state of the first component to be set to the second internal state.

AG. The system of ones of paragraphs AB-AF, wherein the first instructions, when executed by the one or more processors, further cause the one or more processors to provide, as input via the first input interface, at least one of a clock signal, sensor data received from a sensor on an autonomous vehicle, or non-deterministic values usable by the first software component to execute.

AH. A method comprising: controlling, by a first controller, values of one or more variables provided to an input interface associated with a first software component; determining, by the first controller, a time at which to cause the first software component to execute based at least in part on at least one of receiving a message, a specified period, a sequence of events, or a horizon time; causing, at the time and by the first controller, the first software component to execute, execution of the first software component being based at least in part on the one or more variables; receiving, at the first controller and from the first software component, a first output of the execution; and publishing, to one or more subscribers and by the first controller, a first message comprising the first output and at least one of a period of time before the first controller will cause the first software component to execute again or a generation time indicating when the first output was received at the first controller or generated by the first software component.

AI. The method of paragraph AH, further comprising saving, in the log file, at least one of: sensor data provided as input to the input interface; the sequence of events, wherein saving the sequence of events comprises monitoring behavior at the first software component relative to one or more events at another software component, the events comprising at least one of receiving a message, publishing the first message, providing input to the input interface, a start of the execution, a completion of the execution, or receiving the output; data provided as input to the input interface; data received as output from the output interface; or a keyframe generated by the first software component and output via the output interface.

AJ. The method of paragraph AH or AI, wherein the first software component comprises first processor-executable instructions and the method further comprising: replacing the first software component with a second software component such that the input interface provides the one or more variables to the second software component and the second software component is caused to execute at the time by the controller and wherein a second output of execution of the second software component is received via the output interface, wherein the second software component comprises second processor-executable instructions.

AK. The method of ones of paragraphs AH-AJ, further comprising: receiving, at a second controller associated with a second software component, the first message; determining, by the second controller, a first time at which to provide the first message to the second software component based at least in part on a sequence of events; determining, by the second controller, a second time at which to cause the second software component to execute, based at least in part on the sequence; providing, at the first time and by the second controller, the first message to the second software component; causing, at the second time and by the second controller, the second software component to execute one or more times; receiving, at the first controller and from the second software component, a second output of execution of the second software component; and publishing, to one or more second subscribers and by the second controller, a second message comprising the second output and at least one of a second horizon time or a second generation time indicating when the second output was received at the second controller or a discrete execution of the second software component that generated the second output.

AL. The method of ones of paragraphs AH-AK, wherein determining the time comprises: determining that the first software component should execute before or after another event at a different controller, the another event at the different controller specified by a second message received at the first controller from an upstream controller or based at least in part on the sequence.

AM. The method of ones of paragraphs AH-AL, further comprising determining a duration for which to allow the first software component to execute; and preventing the first software component from executing before the time and once the duration expires.

AN. The method of ones of paragraphs AH-AM, further comprising: processing sensor data through the first software component based at least in part on: providing, as input via the input interface, the sensor data as one of the one or more variables; and determining the time based at least in part on determining, based at least in part on the log file, a sequence of events relative to one or more events at least one of the first software component or one or more other components, wherein the one or more events are indicated by one or more messaged received at the first controller from one or more other controllers associated with the one or more other components.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Moreover, such elements and/or blocks in the flow diagrams, when depicted serially, may additionally or alternatively be arranged in any order and/or performed in parallel.

Many variations and modifications may be made to the above-described examples, the elements of which are to be understood as being among other acceptable examples. All such modifications and variations are intended to be included herein within the scope of this disclosure and protected by the following claims.

What is claimed is:

1. A non-transitory computer-readable medium storing:
a first software component comprising:
    an input interface configured to receive, from a controller, an indication to execute the first software component and one or more variables;
    first instructions that, when executed by one or more processors, cause the one or more processors to:
        execute the first software component by processing the one or more variables and responsive to receiving the indication, wherein the processing the one or more variables is accomplished by the first software component executing one or more processor-executable instructions; and
        receive a product of the execution of the first software component, wherein the product represents an output value based on the processing of the one or more variables by the first software component; and
    an output interface configured to output the product to the controller; and
the controller comprising second instructions that, when executed by the one or more processors, cause the one or more processors to perform operations comprising:
    receiving a log file generated by a vehicle, wherein the log file comprises a sequence of events associated with a historical execution of one or more software components of the vehicle;
    controlling values of the one or more variables provided to the input interface;
    controlling a time at which the first software component executes based at least in part on the sequence of events in real-time, wherein controlling the time comprises:

serializing, as a keyframe, an internal state of the first software component;
skipping a discrete execution of the first software component specified by the keyframe at a time subsequent to serializing the keyframe;
deserializing the keyframe to set the internal state of the first software component to match the internal state serialized by the keyframe; and
causing the first software component to execute, starting from the discrete execution by transmitting the indication to the input interface;
receiving the product from the output interface; and
publishing, to a second controller controlling execution of a second software component, a message including the product, wherein the product is used as input to the second software component.

2. The non-transitory computer-readable medium of claim 1, further comprising third instructions that, when executed by the one or more processors, cause the one or more processors to:
exchange the first software component for a third software component, wherein the third software component comprises the input interface and the output interface.

3. The non-transitory computer-readable medium of claim 1, wherein the second instructions, when executed by the one or more processors, further cause the one or more processors to:
provide, as input via the input interface, at least one of a clock signal, sensor data received from a sensor of the autonomous vehicle, or non-deterministic values usable by the first software component to execute.

4. The non-transitory computer-readable medium of claim 1, wherein the second instructions, when executed by the one or more processors or one or more second processors, further cause the one or more processors to:
receive, from an upstream controller associated with a third software component, a second message that comprises a second product of the third software component; and
provide, as input via the input interface, the second product as one of the one or more variables.

5. The non-transitory computer-readable medium of claim 1, wherein:
the output interface is configured to output the keyframe to the controller.

6. The non-transitory computer-readable medium of claim 5, wherein the first instructions, when executed by the one or more processors, further cause the one or more processors to serialize the internal state at least one of periodically or based at least in part on determining that a degree of change of the internal state meets or exceeds a threshold degree of change.

7. The non-transitory computer-readable medium of claim 1, wherein the controller determines the time based at least in part on receiving a duration of time from the second controller controlling execution of the second software component, the duration of time indicative of a minimum time at which the second software component is expected to execute again.

8. The non-transitory computer-readable medium of claim 1, wherein controlling the time at which the first software component executes based at least in part on the sequence of events reproduces the sequence of events as they occurred at the vehicle.

9. A system comprising:
one or more processors; and
non-transitory memory storing:
a first component comprising:
instructions executable by a computing device, the instructions generating a product used, at least in part, by the computing device to control operation of at least one of a machine control apparatus or a data processing pipeline; and
an interface that comprises:
a first input interface configured to receive one or more variables;
a second input interface that receives an indication to execute the instructions; and
a first output interface that outputs the product, based at least in part on receiving the indication, wherein the product represents an output value based on processing the one or more variables by the first component executing one or more processor-executable instructions; and
a first controller associated with the first component and comprising first instructions that, when executed by the one or more processors, cause the one or more processors to:
receive log data generated by a vehicle, wherein the log data comprises a sequence of events associated with a historical execution of one or more software components of the vehicle;
control, via the first input interface, an order in which the one or more variables are provided to the first input interface;
control, via the second input interface and based at least in part on the sequence, when the indication is sent to the second input interface, causing the first component to execute in real-time, wherein controlling when the indication is sent to the second input interface comprises:
serializing, as a keyframe, an internal state of the first component;
skipping a discrete execution of the first component specified by the keyframe at a time subsequent to serializing the keyframe;
deserializing the keyframe to set the internal state of the first component to match the internal state serialized by the keyframe; and
causing the first component to execute, starting from the discrete execution by transmitting the indication to the interface;
receive, via the first output interface, the product; and
publish, to one or more downstream controllers, a message that comprises the product and a time at which the product was received at the first controller.

10. The system of claim 9, wherein the first instructions further cause the one or more processors to store, in the log data, an order of events at the interface relative to one or more events at another component, the events comprising at least one of:
providing the one or more variables to the first input interface,
causing the first component to execute via the second input interface, or
receiving an output from the first component via the first output interface.

11. The system of claim 10, wherein the first instructions, when executed by the one or more processors, further cause the one or more processors to store, in the log data, at least one of sensor data received from a sensor on the vehicle, non-deterministic data consumed by the first component, or diagnostic information regarding execution of the first component.

12. The system of claim 9, wherein the first instructions further cause the one or more processors to:
   prevent the first component from at least one of receiving the one or more variables or executing based at least in part on determining that providing the one or more variables or causing the first component to execute would disrupt the sequence; and
   at least one of provide the one or more variables, cause the first component to execute, or publish the message based at least in part on the sequence.

13. The system of claim 9, wherein the interface further comprises:
   a second output interface that serializes a first internal state of the first component as a first keyframe and outputs the first keyframe, wherein the first internal state comprises at least one of a non-deterministic variable value, a counter value, output context, or an internal variable value that is based at least in part on a previous execution of the first component; and
   a third input interface that receives a second keyframe, deserializes the second keyframe into a second internal state, and causes the internal state of the first component to be set to the second internal state.

14. A method comprising:
   receiving log data generated by a vehicle, wherein the log data comprises a sequence of events associated with a historical execution of one or more software components of the vehicle;
   controlling, by a first controller, an order in which values of one or more variables are provided to an input interface associated with a first software component;
   determining, by the first controller, a time at which to cause the first software component to execute based at least in part on receiving a message and the sequence of events in real-time, wherein determining a time at which to cause the first software component to execute comprises:
      serializing, as a keyframe, an internal state of the first software component;
      skipping a discrete execution of the first software component specified by the keyframe at a time subsequent to serializing the keyframe;
      deserializing the keyframe to set the internal state of the first software component to match the internal state serialized by the keyframe; and
      causing the first software component to execute, starting from the discrete execution by transmitting the message to the input interface;
   causing, at the time and by the first controller based at least in part on the sequence, the first software component to execute, wherein the execution of the first software component determines a first output based at least in part on processing the one or more variables by executing processor-executable instructions by the first software component;
   receiving, at the first controller and from the first software component, a first output of the execution; and
   publishing, to one or more subscribers and by the first controller, a first message comprising the first output and at least one of a period of time before the first controller will cause the first software component to execute again or a generation time indicating when the first output was received at the first controller.

15. The method of claim 14, further comprising saving, in the log file, at least one of:
   sensor data provided as input to the input interface;
   the sequence of events, wherein saving the sequence of events comprises monitoring behavior at the first software component relative to one or more events at another software component, the events comprising at least one of receiving a message, publishing the first message, providing input to the input interface, a start of the execution, a completion of the execution, or receiving the first output;
   data provided as input to the input interface;
   data received as output from the output interface associated with the first software component; or
   a keyframe generated by the first software component and output via the output interface.

16. The method of claim 14, wherein the first software component comprises first processor-executable instructions and the method further comprising:
   replacing the first software component with a second software component such that the input interface provides the one or more variables to the second software component and the second software component is caused to execute at the time by the controller and wherein a second output of execution of the second software component is received via the output interface associated with the first software component,
   wherein the second software component comprises second processor-executable instructions.

17. The method of claim 14, further comprising:
   receiving, at a second controller associated with a second software component, the first message; determining, by the second controller, a first time at which to provide the first message to the second software component based at least in part on a sequence of events;
   determining, by the second controller, a second time at which to cause the second software component to execute, based at least in part on the sequence; providing, at the first time and by the second controller, the first message to the second software component;
   causing, at the second time and by the second controller, the second software component to execute one or more times;
   receiving, at the first controller and from the second software component, a second output of execution of the second software component; and
   publishing, to one or more second subscribers and by the second controller, a second message comprising the second output and at least one of a second horizon time or a second generation time indicating when the second output was received at the second controller or a discrete execution of the second software component that generated the second output.

18. The method of claim 14, wherein determining the time comprises:
   determining that the first software component should execute before or after another event at a different controller, the another event at the different controller specified by a second message received at the first controller from an upstream controller or based at least in part on the sequence of events.

19. The method of claim 14, further comprising
determining a duration for which to allow the first software component to execute; and
preventing the first software component from executing before the time and once the duration expires.

20. The method of claim 14, further comprising:
processing sensor data through the first software component based at least in part on: providing, as input via the input interface, the sensor data as one of the one or more variables; and
  determining the time based at least in part on determining, based at least in part on a log file, a sequence of events relative to one or more events at least one of the first software component or one or more other components,
wherein the one or more events are indicated by one or more messaged received at the first controller from one or more other controllers associated with the one or more other components.

21. The method of claim 14, wherein the values of the one or more variables provided to the input interface and the time at which the processor executable instructions are executed are controlled by the first controller according to a replay operation based at least in part on a sequence of events stored in a log file, the sequence of events defining an order in which the events occurred at one or more components as the one or more components were executed previously.

* * * * *

UNITED STATES PATENT AND TRADEMARK OFFICE
CERTIFICATE OF CORRECTION

PATENT NO. : 12,254,343 B2  
APPLICATION NO. : 16/198653  
DATED : March 18, 2025  
INVENTOR(S) : Jacob Lee Askeland, Ryan Martin Cahoon and Christopher Yeates Brown Page 1 of 1

It is certified that error appears in the above-identified patent and that said Letters Patent is hereby corrected as shown below:

In the Claims

Claim 3, Line 31:
"clock signal, sensor data received from a sensor of the"
Should read:
--clock signal, sensor data received from a sensor of an--.

Claim 15, Line 4:
"the log file, at least one of:"
Should read:
--the log data, at least one of:--.

Claim 21, Line 22:
"time at which the processor executable instructions are"
Should read:
--time at which the processor-executable instructions are--.

Signed and Sealed this  
Fifteenth Day of July, 2025

Coke Morgan Stewart  
*Acting Director of the United States Patent and Trademark Office*